(12) United States Patent
Zakharov et al.

(10) Patent No.: US 11,403,052 B2
(45) Date of Patent: *Aug. 2, 2022

(54) FIRMWARE UPGRADE SYSTEM AND ASSOCIATED METHODS FOR PRINTING DEVICES

(71) Applicant: Kyocera Document Solutions Inc., Osaka (JP)

(72) Inventors: Oleg Y. Zakharov, Walnut Creek, CA (US); Hiroyuki Takaishi, Walnut Creek, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,489

(22) Filed: Aug. 10, 2021

(65) Prior Publication Data

US 2022/0043609 A1 Feb. 10, 2022

Related U.S. Application Data

(63) Continuation of application No. 16/988,924, filed on Aug. 10, 2020, now Pat. No. 11,126,385.

(51) Int. Cl.
*G06F 3/12* (2006.01)
(52) U.S. Cl.
CPC .............. *G06F 3/123* (2013.01); *G06F 3/121* (2013.01); *G06F 3/1204* (2013.01); *G06F 3/1225* (2013.01)

(58) Field of Classification Search
CPC combination set(s) only.
See application file for complete search history.

(56) References Cited

U.S. PATENT DOCUMENTS

| | | | |
|---|---|---|---|
| 2003/0023962 A1* | 1/2003 | Erickson | G06F 8/63 717/171 |
| 2003/0217124 A1 | 11/2003 | Parry | |
| 2006/0080658 A1* | 4/2006 | Marion | G06F 11/36 717/177 |
| 2008/0320110 A1* | 12/2008 | Pathak | G06F 11/1433 717/173 |
| 2013/0250323 A1* | 9/2013 | Wakasa | G06K 15/1809 358/1.11 |
| 2018/0109413 A1* | 4/2018 | Ito | H04L 67/26 |
| 2018/0267864 A1* | 9/2018 | Michishita | G06F 11/1433 |
| 2021/0016861 A1* | 1/2021 | Peterson | E02C 5/00 |
| 2021/0067607 A1* | 3/2021 | Gardner | H04L 41/082 |
| 2021/0124610 A1* | 4/2021 | Gardner | G06F 8/63 |
| 2021/0149681 A1* | 5/2021 | Alon | G11C 7/24 |

* cited by examiner

*Primary Examiner* — Helen Zong
(74) *Attorney, Agent, or Firm* — Millen, White, Zelano & Branigan, P.C.; William Nixon

(57) ABSTRACT

A system of printing devices includes an analytical server that determines when a firmware upgrade is to be installed on one or more of the printing devices. The analytical server collects information about firmware version and type along with errors that occur on the printing devices. The analytical server also collects information on the print volume for each device. A map is generated and updated based on this information that is used to decide when or if the firmware upgrade is to occur. For a first printing device and a second printing device, the analytical server determines whether to upgrade different versions of the firmware at each device.

20 Claims, 15 Drawing Sheets

| Error Code | Date | Description | F/W Version | Other |
|---|---|---|---|---|
| C0001 | Dec. 15, 2019 | Hard Drive Error | 1.0 | XXXX |
| C0002 | Dec. 15, 2019 | Fuser Issue | 1.1 | XXXY |
| CF001 | Dec. 27, 2019 | Memory is Full | 1.1 | XXXZ |
| CF002 | Dec. 20, 2019 | Network Connection | 1.0 | AABB |
| CM001 | Dec. 28, 2019 | OS Crash | 1.2 | BBBB |

Fig. 10

| F/W Version | Number of Installations | Error Code | Number of Errors | Failure Rate | MCBF |
|---|---|---|---|---|---|
| 1.0 | 1000 | C0001 | 14 | 0.014 | Y |
| | | C0002 | 0 | 0.00 | N |
| | | CF001 | 25 | 0.025 | N |
| | | CF002 | 100 | 0.1 | N |
| 1.1 | 500 | C0001 | 20 | 0.04 | Y |
| | | C0002 | 12 | 0.024 | Y |
| | | CF001 | 10 | 0.02 | N |
| | | CF002 | 20 | 0.04 | N |
| 1.2 | 2000 | C0001 | 0 | 0.00 | N |
| | | C0002 | 10 | 0.005 | N |
| | | CF001 | 0 | 0.000 | Y |
| | | CF002 | 10 | 0.005 | Y |

| Device ID | Previous FW version | Previous MCBF | Current FW version | Current MCBF | Current FW installation date |
|---|---|---|---|---|---|
| DEV.0001 | MN.00.00.01 | 6,333 | MN.00.00.03 | 7,888 | 02/02/2018 |
| DEV.0099 | MN.00.00.02 | 8,444 | MN.00.00.05 | 5,222 | 03/03/2020 |

Fig. 15

| Previous FW version | Total devices | FW version | Average MCBF | Average FW installation date |
|---|---|---|---|---|
| MN.00.00.01 | 500 | MN.00.00.03 | 7,888 | 02/05/2016 |
| MN.00.00.02 | 400 | MN.00.00.05 | 6,111 | 03/03/2017 |
| MN.00.00.03 | 200 | MN.00.00.05 | 8,222 | 02/03/2018 |
| MN.00.00.05 | 99 | MN.00.00.06 | 4,333 | 04/03/2020 |

Fig. 16

FIRMWARE UPGRADE SYSTEM AND ASSOCIATED METHODS FOR PRINTING DEVICES

FIELD OF THE INVENTION

The present invention relates to a system of printing devices that implements methods to determine whether to install firmware upgrades on the printing devices.

DESCRIPTION OF THE RELATED ART

Printing devices can upgrade firmware once a new version of firmware is available. Such upgrades may pertain to specific hardware or software components of the printing device. The upgrade, however, may result in additional or new errors or, in some instances, degrade performance of the printing devices. Further, once the firmware upgrade is performed on all the printing devices, any remediation or recall needs to happen for every device. These measures may result in lost time and increased costs associated with using the printing devices.

SUMMARY OF THE INVENTION

A method for implementing firmware upgrades to a plurality of printing devices over a network is disclosed. The method includes storing device information for each of the plurality of printing devices at an analytical server. The device information includes a firmware version and applicable error codes. The method also includes collecting error information having an error code and a date of occurrence for each of the plurality of printing devices at the analytical server. The method also includes storing the error information for the each of the plurality of printing devices at the analytical server. The method also includes determining a mean count between failures for the each of the plurality of printing devices using the error information and a print volume of the device. The method also includes generating a map using the device information, error information including error codes, and the MCBF for each of the plurality of printing devices. The method also includes receiving a request to implement a firmware upgrade for at least one printing device over the network. The method also includes determining whether to send the firmware upgrade to the at least one printing device using the map.

An analytical server to implement upgrades to firmware on a plurality of printing device over a network is disclosed. The analytical server includes a processor and a memory coupled to the processor. The memory stores instructions that, when executed by the processor, configures the analytical server to store device information for each of the plurality of printing devices at the analytical server. The device information includes a firmware version and applicable error codes. The analytical server also is configured to collect error information having an error code and a date of occurrence for each of the plurality of printing devices at the analytical server. The analytical server also is configured to store the error information for each of the plurality of printing devices at the analytical server. The analytical server also is configured to determine a mean count between failures (MCBF) for the each of the plurality of printing devices using the error information and a print volume for the printing device. The analytical server also is configured to generate a map using the device information, error information including error codes, and the MCBF for each of the plurality of printing devices. The analytical server also is configured to receive a request to implement a firmware upgrade for at least one printing device over the network. The analytical server also is configured to determine whether to send the firmware upgrade to the at least one printing device using the map. The analytical server also includes a communication port to send the firmware upgrade to the at least one printing device over the network.

A method for monitoring firmware upgrades for a plurality of printing devices over a network. The method includes collecting a device information number and at least one firmware package having a firmware version for each of the plurality of printing devices at an analytical server. The method also includes collecting error information for each of the plurality of printing devices regarding the at least one firmware package at the analytical server. The error information includes at least one error code and a date of occurrence. The method also includes determining a mean count between failures (MCBF) for the device identification number of each printing device based on the error information. The method also includes generating a map at the analytical server. The map includes the at least one firmware version, the error information including the at least one error code, and the MCBF such that each firmware version within the plurality of printing devices is accounted for in the map. The method also includes receiving a request to upgrade the at least one firmware version on the plurality of printing devices. The method also includes determining whether to upgrade the at least one firmware version for each of the plurality of printing devices using the map.

A method for upgrading different versions of firmware on a plurality of printing devices in a network is disclosed. The method includes storing firmware information for a first version of firmware for a first printing device having a first device identification number. The method also includes storing firmware information for a second version of the firmware for a second printing device having a second device identification number. The method also includes collecting error information for the first version of the firmware. The error information includes an error code and a first date of occurrence for each error. The method also includes collecting error information for the second version of the firmware. The error information includes an error code and a second date of occurrence for each error. The method also includes generating a map of relationships between the first and the second versions of the firmware and the error code within the stored error information. The method also includes receiving an upgrade to the firmware of the plurality of printing devices. The method also includes determining whether to upgrade the first version of the firmware at the first printing device or the second version of the firmware at the second printing device according to the relationships within the map.

An analytical server to upgrade different versions of firmware on a plurality of printing devices in a network is disclosed. The analytical server includes a processor and a memory coupled to the processor. The memory stores instructions that, when executed by the processor, configures the analytical server to store firmware information for a first version of the firmware for a first printing device having a first device identification number. The analytical server also is configured to store firmware information for a second version of the firmware for a second printing device having a second device identification number. The analytical server also is configured to collect error information for the first version of the firmware. The error information includes an error code and a first date of occurrence for each error. The analytical server also is configured to collect error information for a second version of the firmware. The error information includes the error code and a second date of occurrence for each error. The analytical server is configured to generate a map of relationships between the first and the second versions of the firmware and the error code within the stored error information. The analytical server also is configured to receive an upgrade to the firmware on the plurality of printing devices. The analytical server also is configured to determine whether to upgrade the first version of the firmware at the first printing device or the second version of the firmware at the second printing device according to the relationships within the map. The analytical server also includes a communication port to send the upgrade to the first printing device or the second printing device.

A system is disclosed. The system includes a plurality of printing devices having versions of firmware. The system also includes an analytical server connected to the plurality of printing devices over a network. The analytical server sends upgrades to the firmware on the plurality of printing devices. The analytical server is configured to store firmware information for a first version of the firmware for a first printing device having a first device identification number. The analytical server also is configured to store firmware information for a second version of the firmware for a second printing device having a second device identification number. The analytical server also is configured to collect error information for the first version of the firmware. The error information includes an error code and a first date of occurrence for each error. The analytical server also is configured to collect error information for the second version of the firmware. The error information includes the error code and a second date of occurrence for each error. The analytical server also is configured to generate a map of relationships between the first and the second versions of the firmware and the error code within the stored error information. The analytical server also is configured to receive an upgrade to the firmware on the plurality of printing devices. The analytical server also is configured to determine whether to upgrade the first version of the firmware at the first printing device or the second version of the firmware at the second printing device according to the relationships within the map.

BRIEF DESCRIPTION OF THE DRAWINGS

Various other features and attendant advantages of the present invention will be more fully appreciated when considered in conjunction with the accompanying drawings.

FIG. 10 illustrates a block diagram of error codes and associated information according to the disclosed embodiments.

FIG. 15 illustrates a data table for individual devices according to the disclosed embodiments.

FIG. 16 illustrates a data table with records for firmware versions according to the disclosed embodiments.

DETAILED DESCRIPTION OF THE PREFERRED EMBODIMENTS

Figure 1:
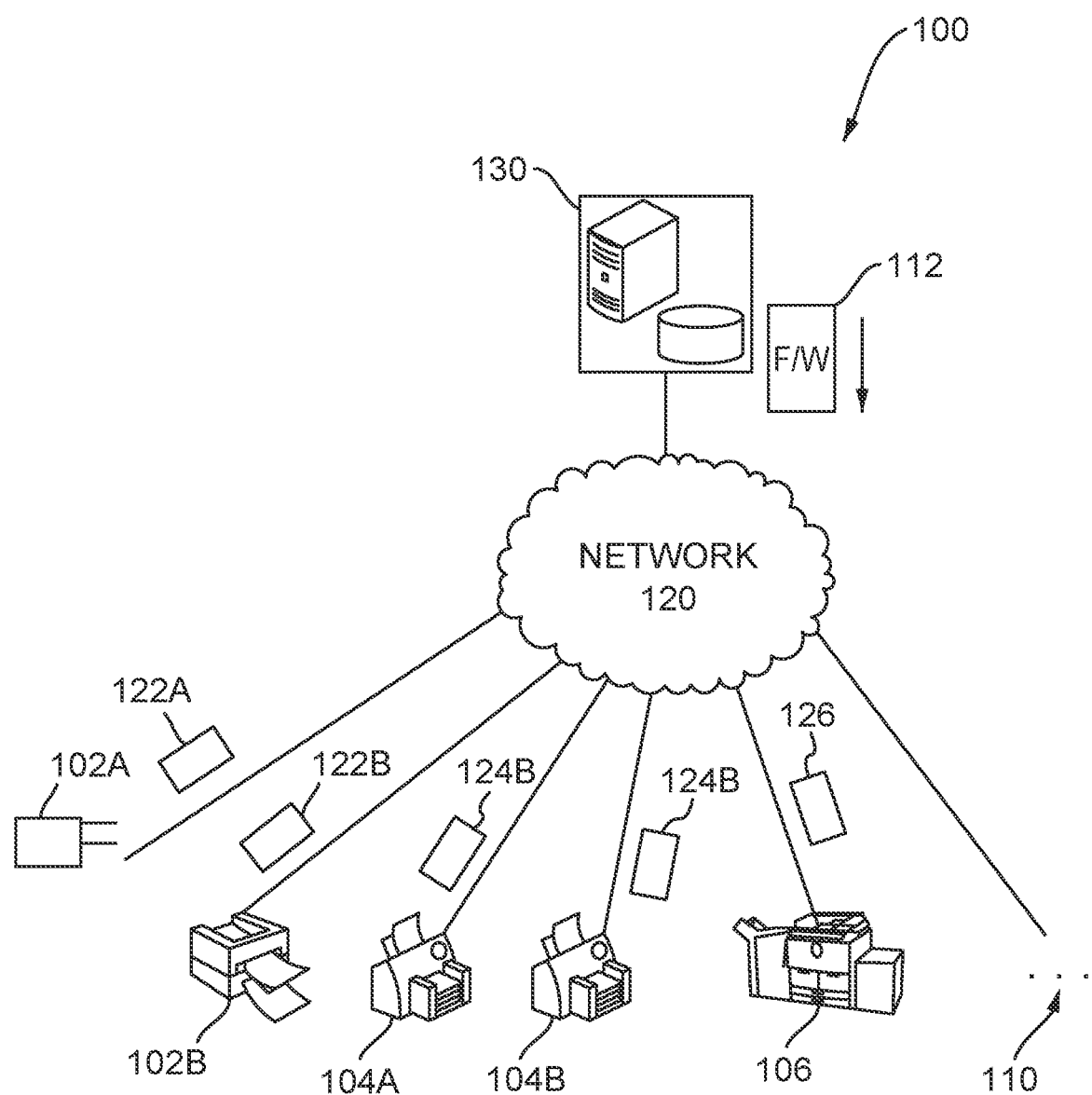
FIG. 1 illustrates a block diagram of a system of a plurality of printing devices and coupled to a server to monitor and upgrade the plurality of printing devices according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Printing devices may upgrade firmware once a new version of firmware is available. A server or other device connected to the printing devices may send the upgrade over a network of the coupled devices. The printing devices, however, may not be identical in components, hardware, or software. The firmware may act differently on the different devices. For example, a firmware upgrade can introduce problems in operation capability or new types of errors.

New firmware may be installed on a plurality of printing devices remotely from a server or other device. The upgraded firmware is installed on the device through a network, such as a wired or wireless network within an organization. The number of errors with a specific error code can be collected on periodic basis, such as daily, from the devices. All devices may be marked with a version of the firmware and the dates when the latest firmware version was installed. These groups of related devices may be known as sets of devices. Each set of devices, related by a device model and a firmware version, will have detected errors occurring in each group of devices. The firmware version, such as the upgraded version, will be discontinued in the instance that new errors occur or problems manifest within the set of devices.

Most of the current firmware restoration processes provide storage on the printing device itself to backup the old version of the firmware. When the old firmware is restored, it is retrieved from local device storage. This aspect means that memory and resources on the printing device is dedicated to storing old firmware packages. The disclosed embodiments reduce the requirements on the printing device by determining when to install firmware upgrades to avoid increased or new errors.

The disclosed embodiments collect information from the devices about firmware version and firmware type, such as main, engine, network, and the like. The disclosed embodiments build a map between firmware information and occurred errors on the printing devices. An analytical server makes a decision whether the new firmware needs to be installed, or pushed, on the printing devices or the new firmware should not be installed. The decision within the analytical server may be based on various criteria, such as whether the occurred error can be fixed without the firmware upgrade, whether the occurred errors can be fixed with the firmware upgrade, and whether new types of errors will be increased with the firmware upgrade. Print volume also may be a factor if the failure rate correlates with a mean count between failures such that only devices with significant print volume will be considered for a firmware upgrade.

The analytical server may automatically update the firmware to selected printing devices based on criteria by system that errors can be fixed with the upgraded firmware. Further, the disclosed embodiments may make a recommended list of devices that should be updated. Alternatively, the disclosed embodiments may send a warning message regarding an issue found by the analytical server when a specific version of the firmware is updated when the errors can be fixed without the upgrade or the number of errors will increase with the upgrade.

The execution of firmware may result in several types of errors. Errors may be hardware or software related. If a device, or group of devices, exhibit many hardware errors, then a firmware upgrade for the software elements will not help. Errors also may occur across different firmware versions such that an upgrade may not help. The disclosed embodiments want to determine a high rate of errors occur for a specific firmware version. A map may be created using vendor error codes, or types of errors, and historical and analytical data. A period of time may be used to collect the data that is used to modify the map. The disclosed embodiments may use the map to determine whether to upgrade firmware within the system of printing devices. The disclosed embodiments also may use an algorithm to identify a defective firmware version using the map or failure rates.

The type of errors that may be experienced on a printing device may vary between device models. Software-related errors may include a memory leak. Hardware-related errors may include image quality effects, print volume, paper jams, broken parts, and the like. The types of firmware may include main, network, or image processing.

FIG. 1 depicts a block diagram of a system 100 of a plurality of printing devices coupled to an analytical server 130 to monitor and upgrade the plurality of printing devices according to the disclosed embodiments. System 100 includes printing devices connected to analytical server 130 via network 120. The plurality of printing devices include printing devices 102A, 102B, 104A, 104B, 106, and additional printing devices 110. Printing devices 102A and 102B may be similar device models while printing devices 104A and 104B also may be similar device models that differ from printing devices 102A and 102B. Printing device 106 may be a different model altogether. Additional printing devices may be associated with the different models. Further, system 100 may include additional models of printing devices not shown here for brevity.

A given printing device may be configured to perform one or more functions such as printing, scanning, emailing, storing, modifying, receiving, or transmitting one or more documents or files. In some embodiments, each printing device may include hardware and software components associated with a firmware package. Firmware may refer to packages of software installed on embedded devices. Each firmware may include a version for the different packages for the components within the printing device. An upgrade version of firmware, or firmware 112, may be sent from analytical server 130 to one or more printing devices within system 100.

Each printing device 102A, 102B, 104A, 104B, 106, and 110 may be configured to perform one or more steps, actions, or functions disclosed herein. For example, printing device 102A may communicate with analytical server 130 to transmit or receive data, or information, 122A via network 120, including error codes, print counter values, time stamps, error intervals, mean time between failures (MTBF), mean count between failures (MCBF), error frequency codes, time intervals, numbers of printed pages, numbers of errors, print volume, and other related information. Each printing device may send and receive its own data packages, as shown in FIG. 1. Data may be routed within system 100 using a protocol, such as TCP/IP, in that each device includes its own unique network address. Thus, printing device 102B may transmit or receive data 122B, printing device 104A may transmit or receive data 124A, printing device 104B may transmit or receive data 124B, printing device 106 may transmit or receive data 126, and so on.

Analytical server 130 may include a cloud-based server, for example, that can perform one or more tasks to manage or maintain printing devices within system 100. Analytical server 130 may communicate with printing devices 102A, 102B, 104A, 104B, 106, and 110 to transmit and receive data. Analytical server 130 also may install firmware 112 on one or more of the printing devices. In some embodiments, analytical server 130 may transmit a command to one or more of the printing devices to reset, install updates, or perform one or more printing or maintenance functions or operations. In other embodiments, analytical server 130 may receive data from one or more printing devices, shown as data 122A-126, such as error codes, print counter values, time stamps, error intervals, mean time between failures (MTBF), mean count between failures (MCBF), error frequency codes, time intervals, numbers of printed pages, numbers of errors, print volume, and other related information.

Analytical server 130 may be configured to perform one or more functions to determine whether to upgrade one or more printing devices with firmware 112. Firmware 112 may represent a version of firmware that may be used to replace one or more firmware packages on a set of printing devices. For example, firmware 112 may be used to upgrade every printing device in system 100 or only a group of printing devices, such as devices 102A and 102B having the same model. Analytical server 130 performs the analysis of incoming data from the printing devices to determine whether to upgrade them with firmware 112. As noted above, firmware 112 may be a firmware package corresponding to only a part of the printing device, such as main, network, or image processing. Failure rates and other information provided by the printing devices determines how or if the upgrade to firmware 112 will be sent or installed.

Analytical server 130 may include one or more computing devices or systems. It also may be consolidated into a single physical location or distributed across two or more physical locations. Analytical server 130 may include hardware, software, or firmware configured to perform one or more functions disclosed below. Analytical server 130 is disclosed in greater detail by FIG. 3.

Network 120 in system 100 may include one or more wired or wireless connections that support communication between the devices of system 100. In some embodiments, network 120 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 120 is configured to allow communication between analytical server 130 and one or more printing devices within system 100, between the printing devices themselves, or between one or more other devices or systems and system 100. Such communications may include commands, requests, or data corresponding to documents, printing-device errors, or other data.

Figure 2:
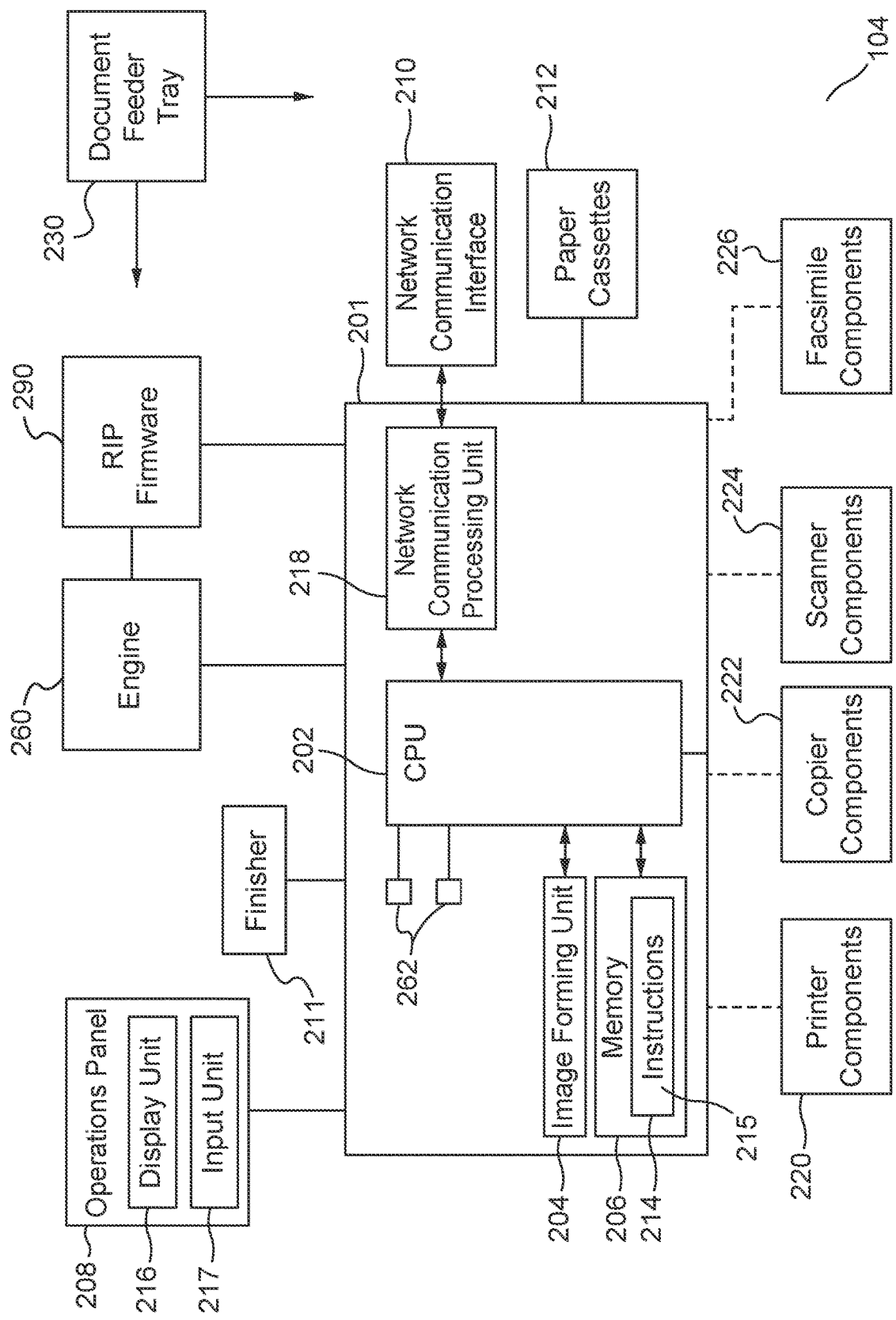
FIG. 2 illustrates a block diagram of components of a printing device according to the disclosed embodiments.

FIG. 2 illustrates a block diagram of components of a printing device according to the disclosed embodiments. In the disclosure of FIG. 2, printing device 104A may be referred to for illustrative purposes. The architecture shown in FIG. 2 may apply to any multi-functional printing device or image forming apparatus that performs various functions, such as printing, scanning, storing, copying, and the like. As disclosed above, printing device 104A may send and receive data from analytical server 130 and other devices within system 100.

Printing device 104A includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104A, using computing platform 201, may be configured to perform various operations, such as scanning, copying, printing, receiving or sending a facsimile, or document processing. As such, printing device 104A may be a printing device or a multi-function peripheral including a scanner, and one or more functions of a copier, a facsimile device, and a printer. To provide these functions, printing device 104A includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104A also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104A to receive papers and documents to be processed. A document is placed on or in document processor input feeder tray 230, which moves the document to other components within printing device 104A. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104A. For example, a storage location 214 may include data for running an operating system executed by computing platform 201 to support the components within printing device 104A. According to the disclosed embodiments, memory unit 206 may store the tokens and codes used in performing operations for printing device 104A.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104A to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104A to act as a printer, copier, scanner, and a facsimile device.

Printing device 104A also includes an operations panel 208, which may be connected to computing platform 201. Operations panel 208 may include a display unit 216 and an input unit 217 for facilitating interaction with a user to provide commands to printing device 104A. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104A.

Printing device 104A also includes network communication processing unit 218. Network communication processing unit 218 may establish a network communication using network 120, such as a wireless or wired connection with one or more other image forming apparatuses or analytical server 130. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104A. CPU 202 also may retrieve information stored in memory unit 206, such as settings for printing device 104A.

Printing device 104A also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104A.

In some embodiments, analytical server 130 may send updates to firmware on printing device 104A. Thus, engine 260 or RIP firmware 290 may be updated by firmware 112, which is a more recent version of the firmware installed on printing device 104A. The installation of the new firmware version, however, may result in additional errors or degradation of performance of printing device 104A. In this instance, printing device 104A may not install firmware 112.

To this end, printing device 104A may include one or more sensors 262 that collect data and information to provide to computing platform 201 or CPU 202. Each sensor 262 may be used to monitor certain operating conditions of printing device 104A. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104A, or the print volume of the printing device over a period of time or other criteria. When a sensor 262 detects an operational issue or failure event, it may send a signal to CPU 202. CPU 202 may generate an error alert associated with the problem. The error alert may include an error code. Computing platform 201 may transmit the error alert along with the error code to analytical server 130.

Display unit 216 may display information about applicable error codes and a short description of the error associated with the operational issue or failure event. Further, display unit 216 may display an instruction on how to proceed (operate) to resolve the error. For example, if a network error occurred, then the following message may be provided on operations panel 208: Reboot the device.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104A communicates with analytical server 130 via network communication interface 210 by utilizing a network protocol, such as the ones listed above. In some embodiments, printing device 104A communicates with analytical server 130 through REST API, which allows the server to collect data from multiple devices via network 120. REST API and SOAP are application protocols used to submit data in different formats, such as files, XML messages, JSON messages, and the like. By utilizing applicable network communication protocols and application protocols, printing device 104A submits the applicable error code or codes to analytical server 130. Analytical server 130 collects error codes from individual devices and stores information in the database for further analysis. The database keeps data include device identification, timestamp, and error code.

Figure 3:
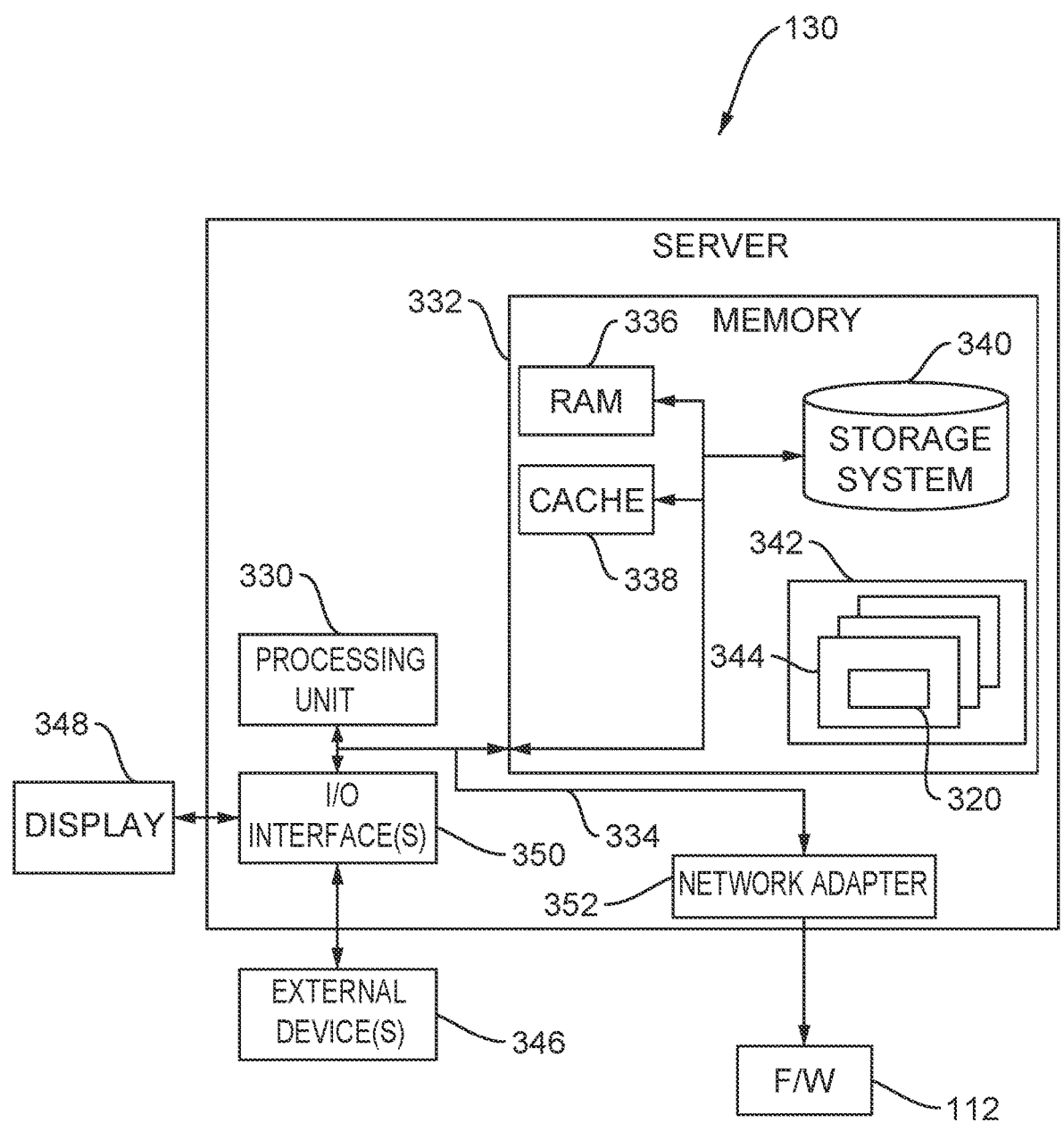
FIG. 3 illustrates a block diagram of an analytical server according to the disclosed embodiments.

FIG. 3 depicts a block diagram of analytical server 130 according to the disclosed embodiments. The components of analytical server 130 may include, but are not limited to, one or more processors or processing units 330 and a server memory 332. A server bus 334 couples various server components including server memory 332 to processing unit 330. Analytical server 130 may include a variety of computer readable media. Such media may be selected from any available media that is accessible by analytical server 130, including non-transitory, volatile, and non-volatile media, removable and non-removable media. Server memory 332 could include one or more personal computing readable media in the form of volatile memory, such as random access memory (RAM) 336 or a cache memory 338. In some embodiments, a storage system 340 may be provided for reading from and writing to a non-removable, non-volatile magnetic media device, such as a hard drive.

Server memory 332 may include at least one program product or utility 342 having a set, or at least one, of program modules 344 that may be configured to perform the functions of the disclosed embodiments. Program modules 344 may include, but are not limited to, an operating system, one or more application programs, other program modules, and program data. Each of the operating systems, one or more application programs, other program modules, and program data or some combination thereof, may include an implementation of a networking environment. Program modules 344 may perform the functions or methodologies of embodiments of the invention as disclosed herein. For example, a program module 344 in analytical server 130 may be configured to determine if components of one of the printing devices of system 100 needs to be replaced or fixed due to a failure event or error within the device.

Analytical server 130 may communicate with one or more external devices 46, such as a keyboard, a pointing device, a stylus, a display 348, or any similar devices, such as a network card, modem, and the like. Display 348 may be a light emitting diode (LED) display, a liquid crystal display (LCD) display, a cathode ray tube (CRT) display, and the like. External devices 346 may enable analytical server 130 to communicate with a printing device. Such communication may occur via input/output (I/O) interfaces 350. Alternatively, analytical server 130 may communicate with one or more networks 120 such as a local area network (LAN), a general wide area network (WAN), or a public network via a network adapter 352. Analytical server 130 may be coupled to network 120 via a wired or wireless connection. Network adapter 352 may communicate with the other components via bus 334.

Any combination of one or more computer readable media, for example, storage system 340, may be utilized. In the context of the disclosed embodiments, a computer readable storage medium may be any tangible or non-transitory medium that contains, or stores, a program, such as program product 342, for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

In some embodiments, analytical server 130 may release firmware 112, which is an upgrade to existing firmware on one or more printing devices within system 100. Firmware 112 may be forwarded to one or more printing devices through network adapter 352 when instructed by processing unit 330. Processing unit 330 may execute instructions stored in server memory 332 to configure analytical server 130 to perform the steps and functions disclosed below. Specifically, instructions stored in program modules 344 may determine whether to upgrade firmware within the plurality of devices in system 100 based on the processes disclosed below.

Each set of printing devices, such as printing devices 102A and 102B and printing devices 104A and 104B, may be related to each other by a model and firmware version. For example, printing devices 102A and 102B may be the same model of device while running the same version of firmware that relates to firmware 112 to be sent to devices within system 100. In other embodiments, printing devices 102A, 102B, and 106 may be the same model of device but printing device 106 runs a different version of firmware than devices 102A and 102B. Each set will have a calculated failure rate based on the number of errors that occur in each set of devices. In other embodiments, the calculated failure rate may correspond to an error code for a failure event that occurs will the firmware is running. With a firmware upgrade, if new errors occur or existing errors increase in occurrence within the set of devices, then the upgraded firmware version may be discontinued. Analytical server 130 may monitor the plurality of devices within system 100 to determine when and if to upgrade firmware to the devices.

Analytical server 130 may collect firmware information from multiple printing devices within system 100. Firmware information may include the firmware version installed on each device, type of firmware version, such as main, engine, network, and the like, and the data of installation. Analytical server 130 also may collect, keep, and analyze data from multiple printing devices in system 100. Each device record may include the device serial number, or identification (ID), firmware version(s), date of firmware installation, the history of errors, and the history of the print volume for the devices. Analytical server 130 generates a map of firmware information mapped to error codes for the plurality of printing devices. Error information may include an error code and dates of error occurrence.

Figure 4:
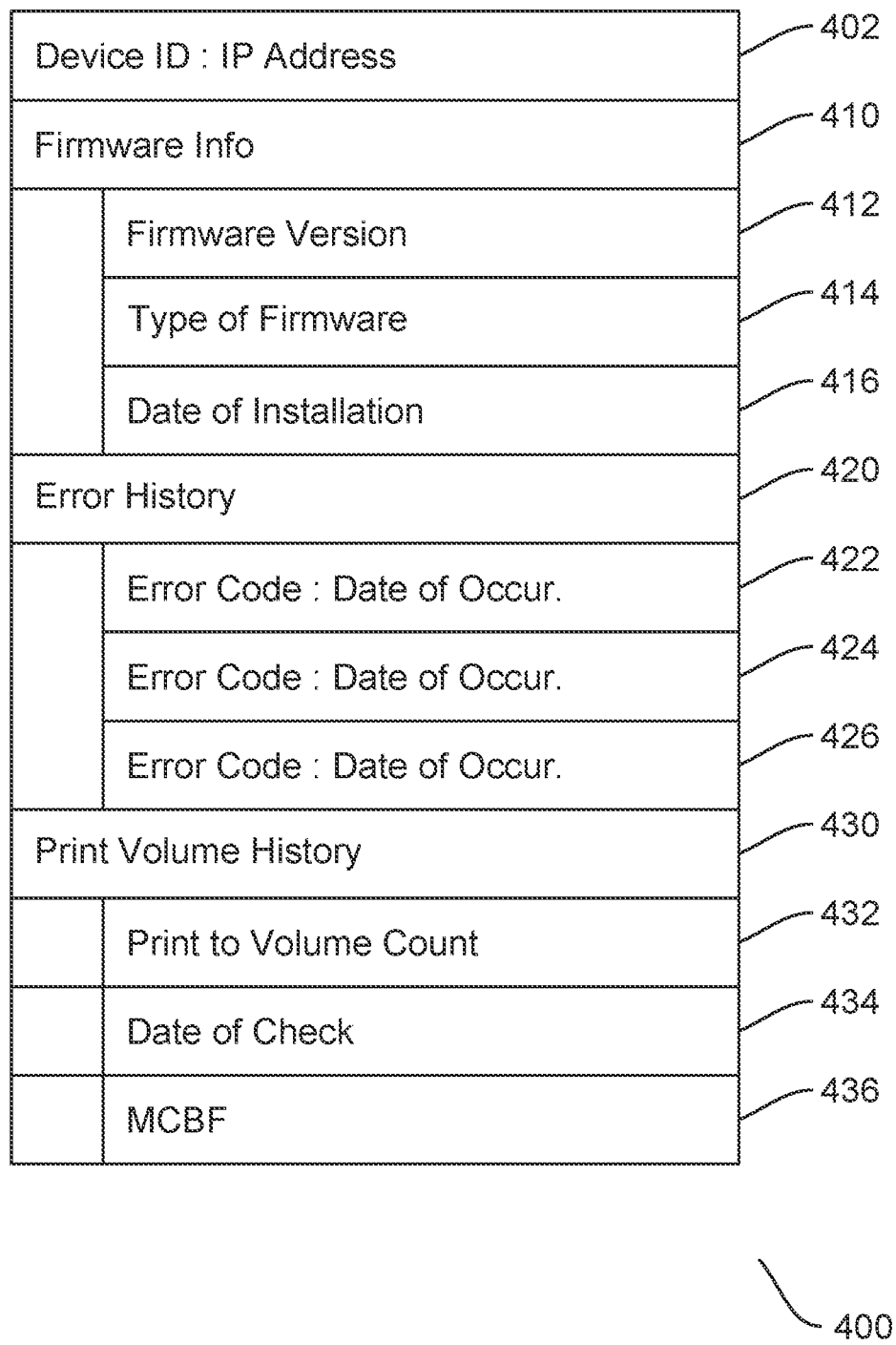
FIG. 4 illustrates a database entry for an analytical server for a database of the plurality of printing devices in the system according to the disclosed embodiments.

FIG. 4 depicts a database entry 400 for analytical server 130 for a database of the plurality of printing devices in system 100 according to the disclosed embodiments. Device identification 402 may refer to a device serial number within system 100. For example, printing devices 102A and 102B may be similar models of printing devices but each has a unique serial number. Further, each device may have a unique internet protocol (IP) address. Entry 400 also includes a field for firmware information 410. Firmware information 410 may pertain to a firmware package on the printing device. More than one firmware package may be installed on a device. This information includes firmware version 412 for the firmware package. There may be more than one firmware package on a device, with each package having its own version. Firmware information 410 also includes type of firmware 414, such as hardware or software, or possibly to a sub-system in the printing device, such as network, scanner, and the like. Firmware information 410 also includes date of installation 416.

Entry 400 also includes fields for error history 420. Each error reported to analytical server 130 may be placed in error history 420. Thus, error 422 includes an error code and data of occurrence entries. Errors 424 and 426 also include this data. Errors 422, 424, and 426 may not relate to the same errors such that the error codes within these fields are not the same. Analytical server 130 may collect errors for a printing device for a period of time, such as a day, week, month, and the like. Analytical server 130 also may compile this information with similar error codes across the various devices to generate a map, as disclosed below.

Entry 400 for device identification 402 also includes print volume history 430. Print volume history 430 includes a print volume count 432 for the printing device. This count also may be determined for a period of time. Date of check 434 includes a date that the last print volume was taken. Thus, one can determine a daily, weekly, hourly, and the like count by the different entries of print volume count 432 at different dates 434. As can be appreciated, there may be multiple print volume count 432 and dates 434 data. MCBF 436 also may be determined for the printing device of device identification 402. As disclosed below, MCBF 436 also may related to the mean count between failures for specific error codes within the printing device.

Analytical server 130 then may make a decision about whether to upgrade the latest firmware on the plurality of printing devices by checking criteria. Analytical server 130 may use the generated map to determine that occurred errors can be fixed without a firmware upgrade. It also may determine that the occurred errors can be fixed with the firmware upgrade. Another determination may include that new types of errors will be increased with the firmware upgrade. If failure rate correlates with print volume, or the mean count between failures (MCBF), then analytical server 130 may only consider an upgrade to those printing devices with significant print volume.

Analytical server 130 collects and process data in order to identify that occurred errors may be decreased, or fixed/eliminated, by applying a new version of firmware. If most of the specific issues may be fixed without applying the latest firmware version, then the firmware upgrade may be postponed for a later deployment. If some printing devices that already have the latest firmware upgrades still have the same errors, then the firmware upgrades also may be postponed by analytical server 130.

Analytical server 130 also collects and processes data not only about errors, but also about print volume within the printing devices of system 100. Based on information about occurred errors and print volume, analytical server 130 calculates the mean count between failures (MCBF) using Equation 1 below:

$$MCBF = Errors/Print\ Volume \qquad \text{Equation 1:}$$

For example, some devices have high daily or monthly print volume, but the number of occurred errors is relatively low. In such cases, the upgrade of the firmware may not be necessary. Further, analytical server 130 may develop and distribute service bulletins based on information about fixed issues as related to recent and old firmware versions.

FIGS. 5-9 depict flowcharts for implementing firmware versions to a plurality of printing devices. The flowcharts of FIGS. 5-9 may refer to features shown in FIG. 1-4 or 10-12 for illustrative purposes. The embodiments disclosed by the flowcharts of FIGS. 5-9, however, are not limited to the features of FIG. 1-4 or 10-12.

Figure 5:
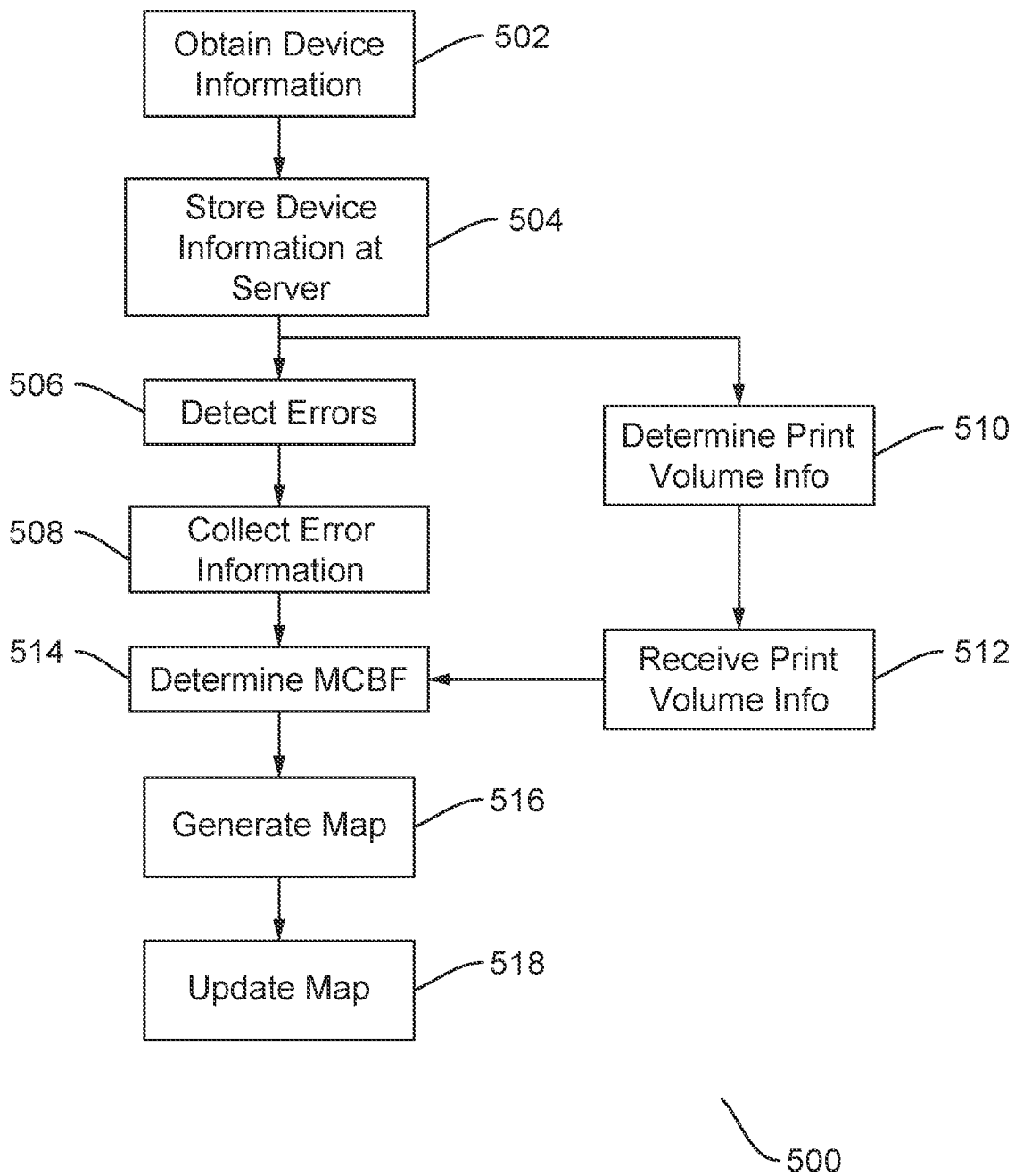
FIG. 5 illustrates a flowchart for collecting information for use by analytical server according to the disclosed embodiments.
Figure 6:
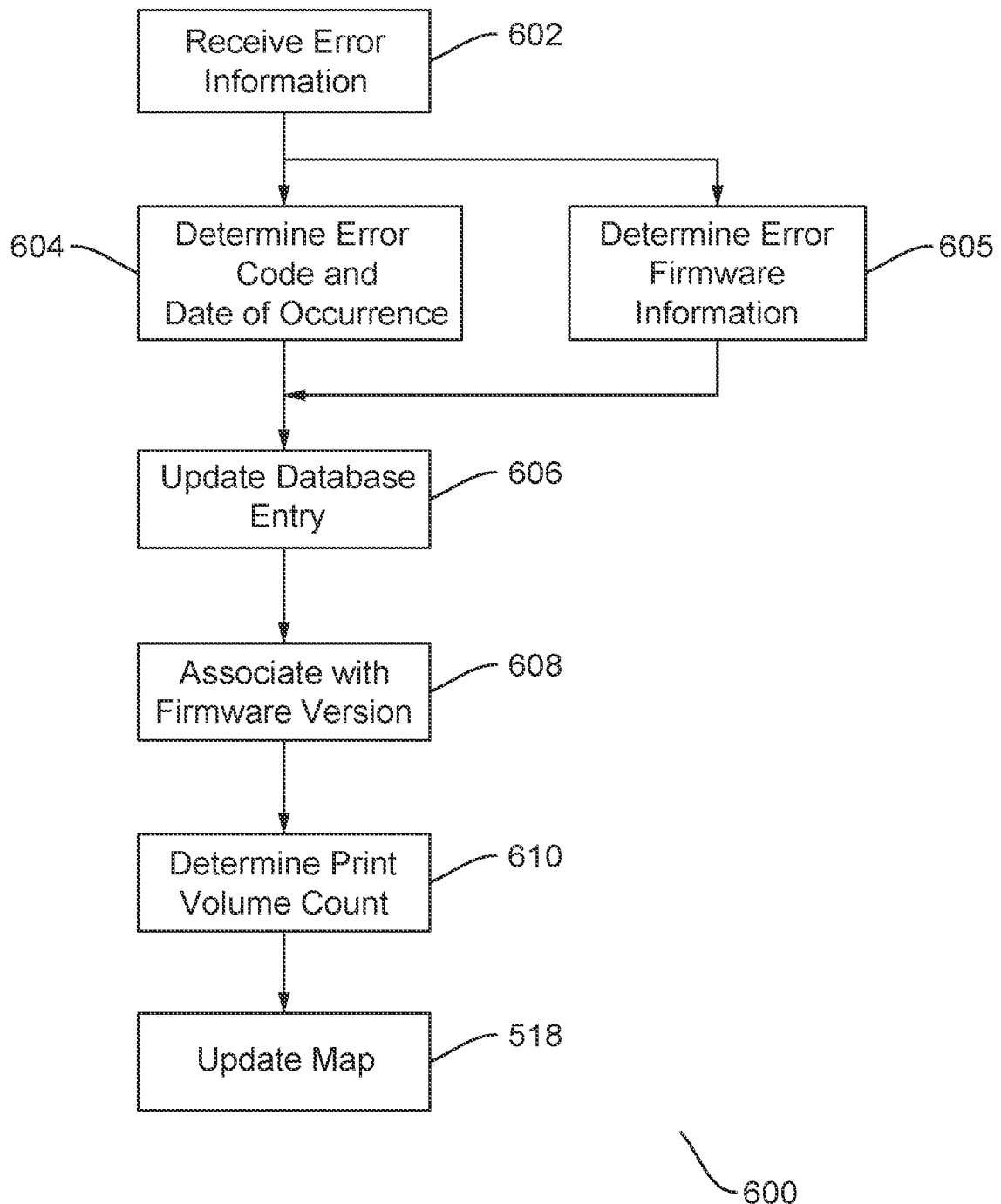
FIG. 6 illustrates a flowchart for collecting error information from a printing device according to the disclosed embodiments.
Figure 7:
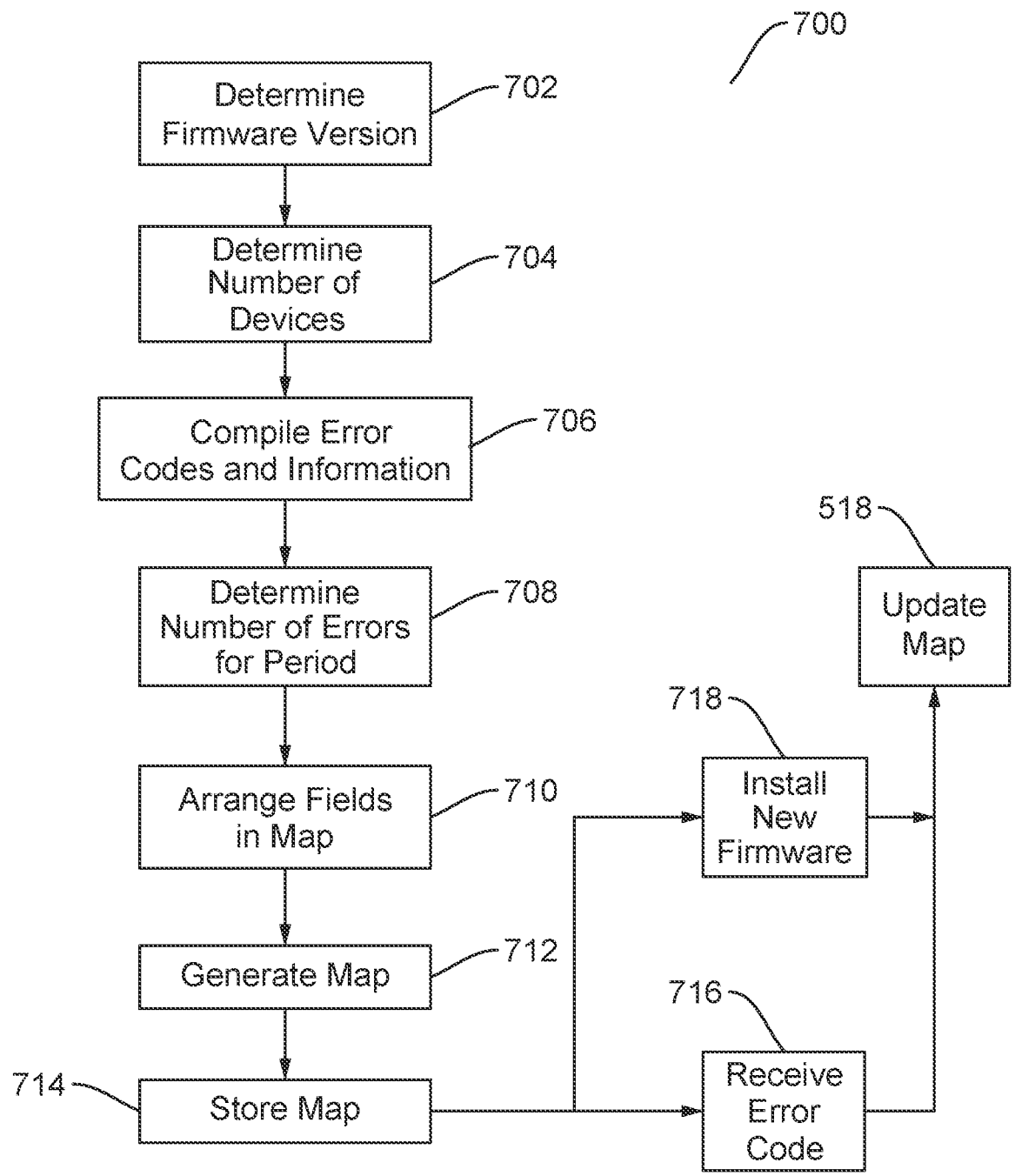
FIG. 7 illustrates a flowchart for generating a map according to the disclosed embodiments.

FIG. 5 depicts a flowchart 500 for collecting information by analytical server 130 according to the disclosed embodiments. Step 502 executes by obtaining device information from the printing devices in system 100. Device information may include device identification 402 and other information shown in entry 400 of FIG. 4. Analytical server 130 may query the printing devices to return their information to construct a database of entries 400. Other information may include firmware information 410 of the different firmware packages on the printing device as well as the applicable version and any date of interest, such as date of installation. Step 504 executes by storing the device information of entries 400 at analytical server 130. Thus, the information may be centrally located. Alternatively, the device information may be shared with the printing devices.

Step 506 executes by detecting errors on the plurality of printing devices. In some embodiments, a subset of the printing devices may be used. Further, printing devices may be grouped by model or criteria so that similar printing devices detect errors. For example, printing devices 102A and 102B may detect errors as well as printing devices 104A and 104B. The detected errors may be grouped to the different groups of devices. Further, errors may be divided into different types of errors, such as hardware or software errors.

Preferably, the printing device will use an error code to indicate the type of error that occurs. An error code may be used instead of textual descriptions. Error codes may correspond to the same error across different printing devices. FIG. 10 depicts a block diagram of a table 1100 error codes and associated information according to the disclosed embodiments. When an error is detected in a printing device, the associated error code along with additional information is provided to analytical server 130. For example, printing device 102B sends data 122B with the error code and associated information to analytical server 130.

Table 1100 may show some examples of error codes 1002 along with information for use by analytical server 130. Error codes 1002 may use different designations to indicate the type of error that is detected. Further, error codes 1002 may distinguish the type of error or where in the printing device the error occurred. For example, error codes C0001 and C0002 may refer to hardware errors while error codes CF001 and CF002 may refer to software errors encountered while executing the firmware. Each error code 1002 may have a date of occurrence 1004. Table 1000 also includes a description 1006 for each error code 1002. This description should apply to the other printing devices under observation.

For example, error code C0001 refers a hard drive error on the printing device while error code C0002 refers to a fuser issue within the printing device. Error code C0001 refers to a hard drive error on printing device 102A as well as printing device 102B. As noted above, error codes C0001 and C0002 may be associated with hardware errors for analytical server 130. Further, error code CF001 may refer to a memory is full condition while error code CF002 may refer to a network connection problem within the printing device. These may be software errors in that an upgrade to the code may fix these problems.

Error code CM001 may refer to another type of error, not really attributable to just hardware or software. It also may reflect a major error that prevents usage of the printing device at all. For example, error code CM001 may refer to an operating system crash that takes the printing device offline.

Error codes 1002 may be sent to analytical server 130 for a single printing device 102B using data 122B. Referring to dates of occurrence 1004, it may be seen that two errors occurred on Dec. 15, 2019, while other errors occurred on December 20, 27, and 28. It appears as though errors occur at a rate of 5 every two weeks. Analytical server 130 may collect error information for any period of time. Alternatively, analytical server 130 may retrieve the error logs within each printing device that includes such information to determine what errors occur in a printing device and how often.

Error codes 1002 also may be associated with firmware versions of the firmware installed on the printing device. As disclosed above, printing devices may have different firmware packages installed that handle the different components of the device. These firmware packages may have different versions implemented by analytical server 130. Thus, for example, printing device 102B may implement a hardware firmware package and a software firmware package. The original packages may be reflected as firmware version 1.0 in table 1000. An upgrade to the hardware firmware package may have occurred on December 15 and an upgrade to the software firmware package on December 22. Thus, error codes issued before the upgrades may be associated with firmware versions 1.0 while those issued after the upgrades are associated with firmware versions 1.1. Error code CM001 may be associated with an overall firmware package 1.2.

Error codes 1002 also may be associated with other information 1010. Other information 1010 may include data requested by analytical server 130, such as the type of error associated with the error code, time of day of occurrence, date of firmware installation, print volume count at the time of the error, and the like.

Step 506 may execute for a given period of time, such as a week, month, and the like. During the detection period, step 508 also executes by collecting the error information provided to analytical server 130. The error information may be similar to the information shown in table 1000. This step may be disclosed in greater detail by FIG. 6, which depicts a flowchart 600 for collecting error information from a printing device according to the disclosed embodiments.

Step 602 executes by receiving the error information from a printing device, such as printing device 102B, at analytical server 130. Step 604 executes by determining error code 1002 and date of occurrence 1004 from the received information. Step 605 executes by determining firmware version 1008 for the error as well as the firmware package and other information 1010. Step 606 executes by updating database entry 400 with this information. Referring to FIG. 4, entry 400 may include error code 1002 into error code field 422 along with date of occurrence 1004. Step 608 executes by associating error code 1002 with a firmware version 1008 in entry 400. Thus, the error code is attributed to the proper firmware package running on the printing device. Step 610 may execute by determining a print volume count 432 for the printing device at the time of occurrence. Flowchart 600 then may proceed to step 518, if applicable. Step 518 is disclosed in greater detail below.

Referring back to flowchart 500, step 510 executes by determining print volume information at the printing device. A print volume count may be provided to analytical server 130 at specified times to update or log the print volume history of the printing device. Each printing device in system 100 may provide such data. Print volume may be significant in that errors may occur after the printing device is used for many operations. Step 512 executes by receiving the print volume information at analytical server 130. The appropriate print volume count 432 in entry 400 may be updated.

Step 514 executes by determining the MCBF for the printing device. Alternatively, the MCBF may be determined for an error code, firmware version, or other criteria according to the disclosed embodiments. MCBF may be determined by Equation 1, disclosed above. In short, MCBF= (Errors/Print Volume). Referring to table 1000, 5 errors are detected in printing device 102B for a two week period. The print volume for this period may be 1000 pages. Thus, printing device 102B may have an MCBF of 0.005. In another example, if 40 instances of error code C0001 is observed for 1000 pages during this period, then the error code has an MCBF of 0.04. The use of MCBF in implementing firmware upgrades is disclosed in greater detail below. The appropriate MCBFs may be stored in entry 400 or in a separate file/database by analytical server 130.

Figures 11, 12:
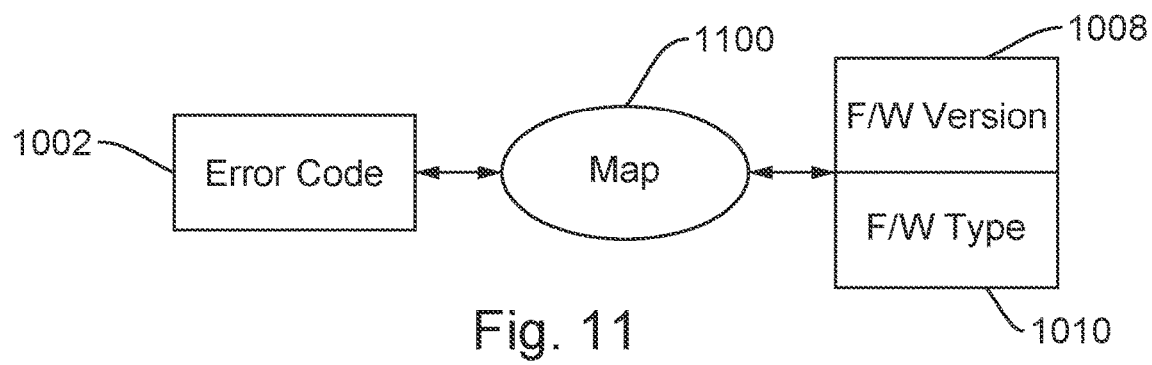
FIG. 11 illustrates the map receiving data according to the disclosed embodiments.
FIG. 12 illustrates a map according to the disclosed embodiments.

Step 516 executes by generating a map for use by analytical server 130. This step is disclosed in greater detail by FIG. 7, which depicts a flowchart 700 for generating a map 1100 according to the disclosed embodiments. Other processes may be used to generate map 1100. Referring to FIG. 11, map 1100 is shown receiving data according to the disclosed embodiments. Map 1100 maps firmware information, shown as firmware version 1008 and other information 1010 (as firmware type), with error codes 1002 received at analytical server 130. This process is iterative in that map 1100 is updated with error codes 1002 as they occur. In the disclosed embodiments, error codes 1002 are associated with the appropriate firmware version 1008 on the applicable printing device.

Step 702 executes by determining the firmware versions to be used in map 1100. In some embodiments, every firmware version 1008 in system 100 may be determined. In other embodiments, firmware versions 1008 of a set of printing devices, such as devices 102A and 102B, may be determined. As disclosed above, different firmware versions may execute across the various printing devices such that a single firmware version, such as a version 1.1, is not executing on all devices. Map 1100 may be configured by the firmware versions of interest with the other information organized in relation to the firmware versions.

Step 704 executes by, for each firmware version, determining the number of devices executing the version. The number of devices may be used for failure rate determinations. Step 706 executes by compiling error codes and information from analytical server 130. The disclosed embodiments may look at the error historical data in entries 400 for the printing devices. Error codes listed in the entries may be associated with the firmware versions used in map 1100. Step 708 executes by determining the number of errors detected by analytical server 130 from the printing devices executing the firmware versions. Preferably, the number of errors pertain to error codes 1002 received over a period of time, such as daily, weekly, monthly, and the like.

Step 710 executes by arranging, or configuring, the fields in map 1100. Referring to FIG. 12, a map 1100 and preferred fields are shown according to the disclosed embodiments. The embodiments disclosed by map 1100 in FIG. 12 may be examples. Map 1100 may include additional or fewer features than those shown in FIG. 12. Map 1100 may be organized by firmware versions 1202, taken from firmware versions 412 of entries 400. For example, map 1100 may include fields for firmware versions 1.0, 1.1, and 1.2. Firmware versions 1.1 and 1.2 may be upgrades to firmware version 1.0 to address errors detected in the original version. Number of installations 1204 refer to the number of printing devices executing the corresponding firmware version 1202. Number of installations may be further broken down by device model or other criteria.

Error codes 1206 may be the error codes associated with the corresponding firmware version 1202. As disclosed above, error codes 1002 are detected and sent to analytical server 130. Part of the information provided with the error codes is the firmware version executing on the printing device at the time of the error. This information may be used to list all the applicable error codes detected while the firmware version executed on the printing devices. Error codes 1206, for example, may include error codes C0001, C0002, CF001, and CF002. For illustrative purposes, error codes C0001 and C0002 may refer to hardware errors detected while executing the associate firmware version and error codes CF001 and CF002 may be software errors. In some embodiments, the firmware versions may be further broken down in hardware firmware versions and software firmware versions, for example, that are separate entries such that these error codes are associated with those versions.

Error codes 1206 also include number of errors 1208, failure rates 1210, and MCBF correlations 1212. Each error code may include the number of errors observed during a period of time. As the error code is associated with the firmware version, the disclosed embodiments may check the date of occurrence in entry 400 to determine whether the error occurred during the period of time. If so, then it is noted as an error. For example, if the period of time for generating map 1100 is six months, then errors associated with error code C0001 occurred 14 times during that period for firmware version 1.0, 20 times for firmware version 1.1, and 0 times for firmware version 1.2. Failure rate may refer to the number of errors divided by the number of printing devices running the firmware version, as shown in map 1100. Alternatively, failure rate may be the number of errors divided by a length of time, such as so many errors per month. MCBF correlation refers to whether the number of errors correlates to a print volume of the printing devices. Some devices may manifest errors after so many pages have been printed.

The values in the fields of map 1100 may be used to determine whether to upgrade the firmware versions. These features are disclosed in greater detail below. It should be noted that map 1100 may be updated with error codes 1002 as they occur and received by analytical server 130. Thus, map 1100 may be continuously changing to reflect the impact that the different firmware versions have on errors within the printing devices. Map 1100 may be a dynamic map in that it changes over time. A map used six months ago may not provide the same determination as one used today.

Referring back to flowchart 700, step 712 executes by generating map 1100 using the data and information available to analytical server 130. Analytical server 130 uses the information on firmware versions and error codes to populate the fields in map 1100. Step 714 executes by storing map 1100 in a memory location within analytical server 130. Referring back to FIG. 3, map 1100 may be stored in memory 332.

Subsequent actions that occur in system 100, or within a group of printing devices, may be detected and used to update map 1100. Thus, step 716 executes by receiving an error code 1002 at analytical server 130 from a printing device. Step 718 also executes by installing a new firmware version on one or more printing devices.

Referring back to flowchart 500, step 518 executes by updating map 1100 with the results of step 716 or 718. The error code information may be added to the appropriate firmware version field in map 1100. If the error code is new, then a new field may be created. For a new firmware version, a new field may be created and the appropriate detection and collection activities for errors used to populate information for the new firmware version. For example, error code 1002 is received at analytical server 130 that indicates an error having an error code CF001 is detected on a printing device executing firmware version 1.1. Referring to map 1100, the number of errors value is increased accordingly. Referring to FIG. 12, number of errors 1208 is increased from 10 to 11 for error code CF001 associated with firmware version 1.1. Failure rate 1210 also may be adjusted accordingly.

Figure 8:
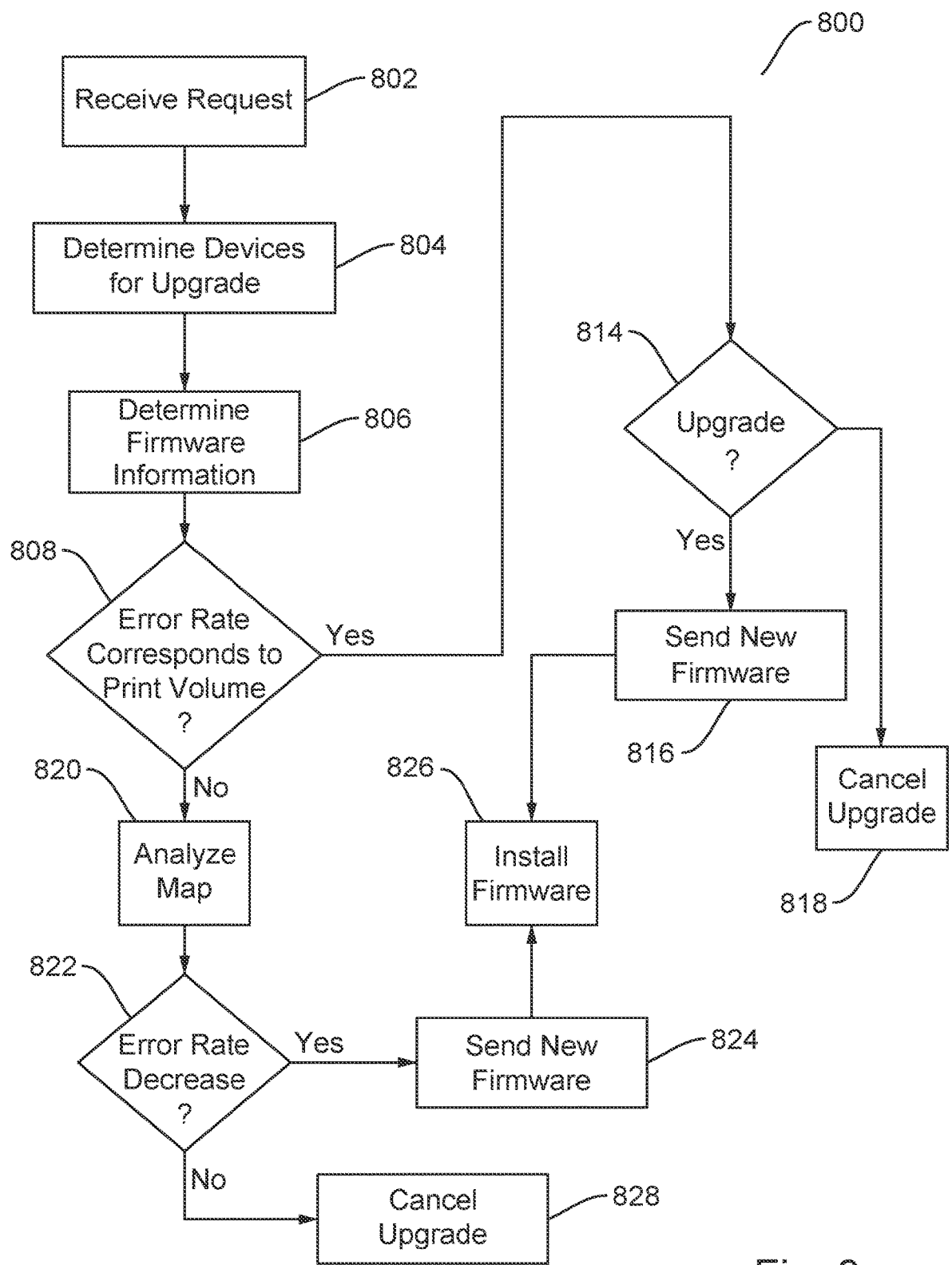
FIG. 8 illustrates a flowchart for determining whether to upgrade firmware at one or more printing devices according to the disclosed embodiments.

FIG. 8 depicts flowchart 800 for determining whether to upgrade firmware at one or more printing devices according to the disclosed embodiments. After map 1100 is generated, it may be used to determine whether to deploy a firmware upgrade based on the information therewithin. Analytical server 130 may determine, using the error information for the various firmware upgrades, whether to install the requested firmware upgrade. Analytical server 130 also may take into account print volume and its correlation to errors.

Step 802 executes by receiving a request to install a new firmware version, or upgrade the firmware in one or more printing devices. Step 804 executes by determining the printing devices subject to the upgrade. As disclosed above, the printing devices may have a device identification to indicate the individual devices within system 100. In some embodiments, this step may be skipped.

Step 806 executes by determining the firmware information from the request. This may result in different processes, as disclosed below. The request may include the firmware version for upgrade, such as firmware version 1.0, 1.1, or 1.2 shown in FIG. 12. Alternatively, the upgrade may list the printing devices eligible for installation. Analytical server 130 determines the applicable firmware versions from entries 400. The firmware version information may be logged by analytical server 130 in consulting map 1100.

Step 808 executes by determining whether the error rate of the firmware version corresponds to the print volume. This determination may be accomplished in different manners. A flag may be set in map 1100 or elsewhere that indicates the print volume impacts error rate. Alternatively, a value for MCBF may be determined for the firmware version in that a value above a certain amount indicates a high mean count between failures. Further, the MCBF may be determined over a period of time to indicate that a high print volume results in high probably of errors.

Figure 13:
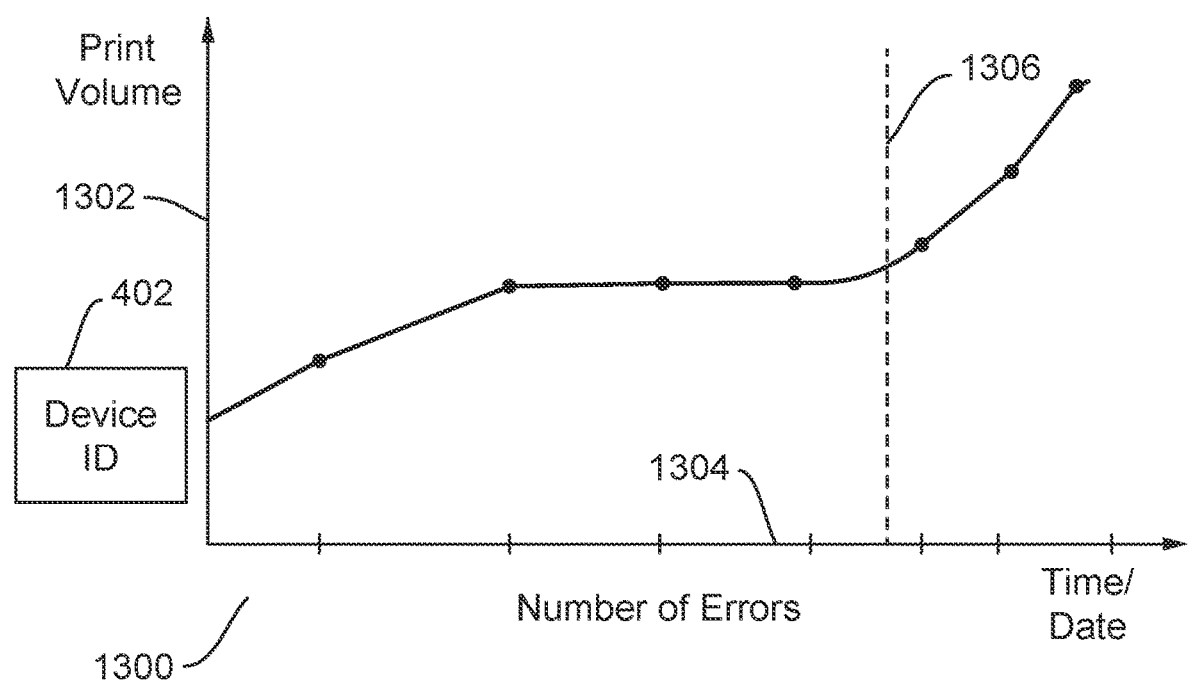
FIG. 13 illustrates a graph of print volume versus the number of errors according to the disclosed embodiments.

This feature may be shown by FIG. 13, which depicts a graph 1300 of print volume versus the number of errors for a device having a device identification 402. As can be seen, print volume 1302 increases over time as more pages are printed on the printing device. At some point 1306, it may be seen that the number of errors increases after the print volume reaches a certain level of usage. Thus, analytical server 130 may determine this point 1306 and indicate as such in map 1100.

If step 808 is yes, then flowchart 800 proceeds to step 814, which executes by determining whether to upgrade the firmware version based on the print volume. If failure rate correlates with the print volume or MCBF, then only devices with significant print volume will be considered for the firmware upgrade. Analytical server 130 may refer to MCBF correlation 1212 in map 1100 then analyze the print volume for the devices. Step 814 may execute for each device individually. For example, some devices have high daily or monthly print volume, but the number of occurred errors is relatively low. In such a case, the installation of the firmware upgrades may not be necessary.

If step 814 is yes, then step 816 executes by sending the firmware upgrade, or new firmware, to one or more printing devices. Flowchart 800 then may proceed to step 826 by installing the firmware upgrade. If step 814 is no, then step 818 executes by cancelling the firmware upgrade.

If step 808 is no, then step 820 executes by analyzing map 1100 using the firmware information. Step 822 executes by determining whether the error rate will decrease on the printing device using the firmware version upgrade. Analytical server 130 may analyze map 1100 to make determinations about whether the firmware upgrade will be effective. For example, it may be seen from map 1100 that firmware version 1.1 upgrade for firmware version 1.0 was not effective in addressing hardware errors C0001 and C0002 but appears to be effective in addressing software errors CF001 and CF002. Thus, firmware version 1.1 may be installed on printing devices trying to reduce the number of software errors thereon but not those trying to reduce the number of hardware errors.

Alternatively, firmware version 1.2 appears to be effective in reducing the number of errors for both hardware and software problems. Thus, analytical server 130 may determine to install firmware version 1.2 if requested, especially for error codes CF001 and CF002. Analytical server 130 also may determine if the failure rates 1210 are reduced for the error codes by firmware installation. If the failure rate is decreased by a certain amount, then analytical server 130 will recommend installation of a firmware upgrade.

For a new firmware version, map 1100 may be analyzed to see if any firmware upgrades addressed specific problems. Referring to error code C0002, it appears as subsequent firmware versions 1.1 and 1.2 made the number of these errors increase. Thus, a firmware version upgrade will not be recommended to address problems related to error code C0002.

If step 822 is yes, then step 824 executes by sending the new firmware, or firmware upgrade, to the one or more printing devices. Each printing device may evaluate individually. Step 826 executes by installing the firmware version indicated. If step 822 is no, then step 828 executes by cancelling the firmware upgrade.

Figure 9:
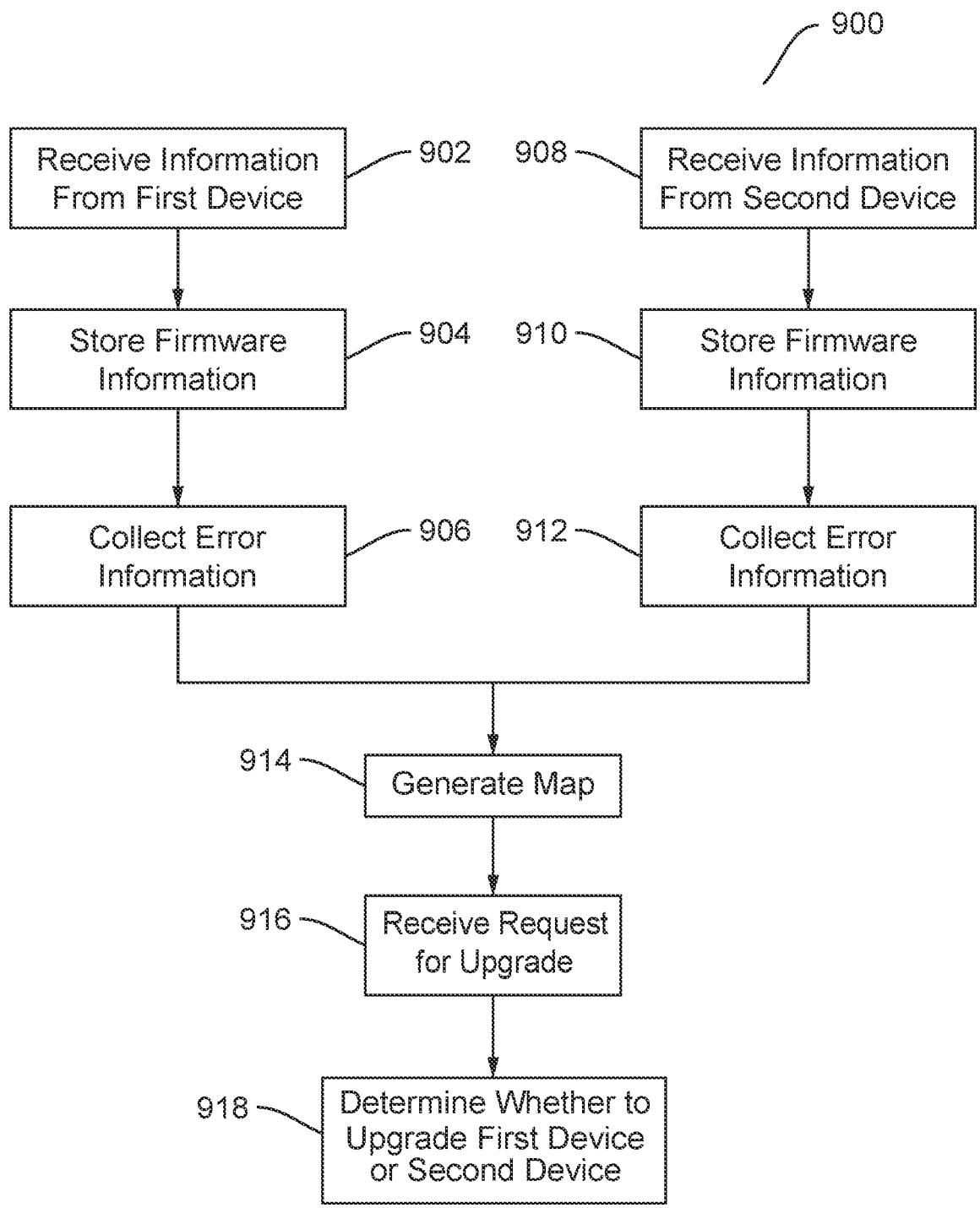
FIG. 9 illustrates a flowchart for determining whether to upgrade firmware at one of two printing devices according to the disclosed embodiments.

FIG. 9 depicts a flowchart 900 for determining whether to upgrade firmware at one of two printing devices according to the disclosed embodiments. Flowchart 900 discloses another embodiment of determining whether to upgrade firmware at two printing devices. The printing devices may be similar yet execute different firmware versions that have different error data within map 1100.

Referring back to FIG. 1, printing device 102A may execute firmware version 1.0 while printing device 102B may execute firmware version 1.1. Analytical server 130 may receive a request to upgrade both printing devices to firmware version 1.2. Map 1100 may be used to determine whether to install firmware version 1.2 on printing device 102A, printing device 102B, or both.

Step 902 executes by receiving information, preferably in the form of an entry 400 shown in FIG. 4, from a first printing device. The first printing device may be printing device 102A. Step 904 executes by storing the firmware information for printing device 102A, as disclosed above. Step 906 executes by collecting error information from printing device 102A, such as error codes, dates of occurrences, and other information, as shown in FIG. 10.

Step 908 executes by receiving information, preferably in the form of an entry 400 shown in FIG. 4, from a second printing device. The second printing device may be printing device 102B. Step 910 executes by storing the firmware information for printing device 102B, as disclosed above. Step 912 executes by collecting error information from printing device 102B, such as error codes, dates of occurrences, and other information, as shown in FIG. 10.

Step 914 executes by generating map 1100 including the firmware and error information for printing devices 102A and 102B. As noted above, printing device 102A may run firmware version 1.0 and printing device 102B may run firmware version 1.1. Map 1100 may be stored on analytical server 130.

Step 916 executes by receiving a request to upgrade the firmware versions on printing devices 102A and 102B. For example, analytical server 130 may determine whether to install firmware version 1.2 on the printing devices. Step 918 executes by determining whether to upgrade printing device 102A or printing device 102B, or both, using map 1100. The disclosed embodiments may refer back to flowchart 800 for these determinations. Referring the map 1100, it may be determined that firmware version 1.2 reduces the number of errors for error codes C0001, CF001, and CF002. It does not reduce the number of errors associated with error code C0002. Thus, firmware version 1.2 may be recommended for installation for printing devices 102A and 102B, unless the upgrade is to reduce the errors associated with error code C0002. A different determination may be made. For printing device 102A, firmware version 1.2 increases the number of errors associated with error code C0002. Thus, analytical server 130 will not send the upgrade to printing device 102A. Firmware version 1.2 does reduce the number of C0002 errors over firmware version 1.1. Analytical server 130, therefore, may send firmware version 1.2 to printing device 102B.

Figure 14:
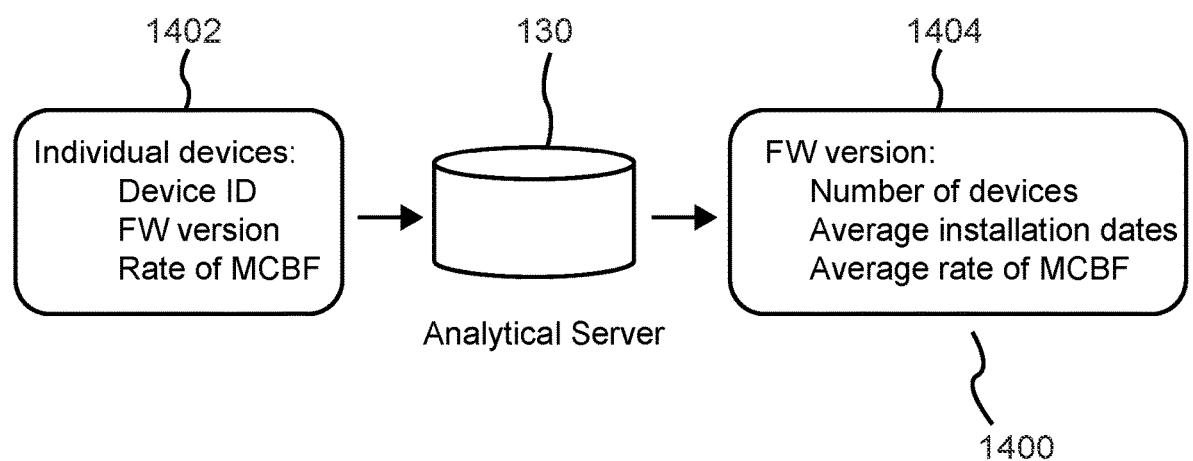
FIG. 14 illustrates a block diagram of an analytical server with data tables used to map records of individual devices to statistics of firmware versions according to the disclosed embodiments.

FIGS. 14-16 depicts alternative embodiments for generating and using map 1100 to determine whether to implement firmware upgrades to printing devices according to the disclosed embodiments. Analytical server 130 may store these tables and use them in accordance with the embodiments disclosed by FIGS. 1-13. The embodiments disclosed in FIGS. 14-16 relate to using the MCBF as the basis for determining whether to implement a firmware upgrade. This process may differ from those disclosed above in how the information from the printing devices is collected and used in the analysis to determine whether to proceed.

FIG. 14 depicts a block diagram of analytical server 130 with data tables 1402 and 1404 used to map records of individual devices to statistics of firmware versions according to the disclosed embodiments. These records may be used to make determinations using the MCBF rates between firmware versions. Analytical server 130 may compile the data for tables 1402 and 1404 using error information compiled from the different printing devices connected to the analytical server in system 100, as disclosed above. Data table 1402 may include information provided by the printing devices regarding device identification, firmware version currently executing on the respective printing device, and a determined rate of MCBF. In some embodiments, analytical server 130 may keep records of errors detected at the printing device, as disclosed above. In other embodiments, each printing device may determine its own MCBF while executing a firmware version.

Analytical server 130 uses the information compiled in data table 1402 to generate data table 1404. The information may be mapped to data table 1404 which then may be used with map 1100, disclosed above, to determine whether the MCBF data indicates that a firmware upgrade should be implemented. In other embodiments, the MCBF data in data table 1402 may be used as the criteria to determine whether to implement the firmware upgrade. Data table 1404 may include information for a number of devices, the average installation dates, and the average rate of MCBF. These features are disclosed in greater detail below.

FIG. 15 depicts a data table 1402 for individual devices according to the disclosed embodiments. The data table for records for individual devices and its preferred fields are shown according to the disclosed embodiments. The embodiments disclosed by data table 1402 in FIG. 15 may be examples. Data table 1402 may include additional or fewer features than those shown in FIG. 15.

Data table 1402 includes device identification field 1502 with lists the device identification numbers for the printing devices in system 100. System 100 includes printing devices 102A-106. Each one includes its own device identification, which may be a serial number, IP address, or other unique indicator that distinguishes the device from others within system 100. Analytical server 130 may list all connected devices in data table 1402. As disclosed above, each printing device is running a firmware version for printing operations and the like. Errors occur that are recorded and tracked by analytical server 130.

Thus, data table 1402 also includes previous firmware version field 1504 that records the previous firmware version number or designator that executed on the respective printing device as matched to the device identification. The MCBF for the previous firmware version is shown in field 1506, which includes a value for the mean count between failures during printing operations as determined by analytical server 130. Alternatively, each printing device may determine its own mean count between failures. The MCBF values listed in fields 1506 and 1510 may be averages of the count between failures detected by the printing device.

For the current firmware version, data table 1402 includes current firmware version field 1508 that includes the current firmware version number or designator executing on the respective printing device. As disclosed above, not every printing device executes the same firmware version. The MCBF for the current firmware version is shown in field 1510, which includes the value for the mean count between failures during printing operations using the current version as determined by analytical server 130. Alternatively, each printing device may determine its own mean count between failures for the current firmware version.

Data table 1402 includes entries 1520 and 1530. Additional entries may be within the data table, but not shown for brevity. In some embodiments, every printing device within system 100 is included in data table 1402. For entry 1520, the following information is provided. Field 1502 includes a device identification number of DEV.0001 for a printing device within system 100. As disclosed above, the printing device provides error codes and information to analytical server 130. Field 1504 indicates that DEV.0001 previously ran firmware version MN.00.00.01 with a MCBF value of 6,333, as shown in field 1506. Entry 1520 also includes fields for the current firmware version. Field 1508 indicates that the current firmware version is MN.00.00.03 with a MCBF value of 7,888, as shown in field 1510. Thus, the MCBF value increased with the new firmware version. Field 1512 for entry 1520 includes a current firmware installation date of Feb. 2, 2018.

Entry 1530 includes the same type of information as entry 1520. Field 1502 includes a device identification number of DEV.0099. Field 1504 includes the previous firmware version of MN.00.00.02 having a MCBF value of 8,444, as shown in field 1506. Field 1508 lists the current firmware version for DEV.0099 as MN.00.00.05 having a MCBF value of 5,222, as shown in field 1510. Field 1512 for entry 1530 shows a current firmware installation date of Mar. 3, 2020. Thus, unlike the firmware upgrade for DEV.0001, the firmware upgrade for DEV.0099 decreased the MCBF value. Firmware MN.00.00.05 appears to have reduced the amount of printing that can be done before a failure event.

FIG. 16 depicts a data table 1404 with records for firmware versions according to the disclosed embodiments. Data table 1404 may be generated by analytical server 130 using data table 1402. Analytical server 130 takes the information provided in data table 1402 to determine the number of devices currently running the various versions of firmware as well as the previous version of firmware and uses the MCBF values to provide a mapped resource to determine whether the MCBF differences indicate that the firmware version should be upgraded. The embodiments disclosed by data table 1404 in FIG. 16 may be examples. Data table 1404 may include additional or fewer features than those shown in FIG. 16.

Data table 1404 includes fields 1602, 1604, 1606, 1608, and 1610. Entries 1620, 1630, 1640, and 1650 in data table 1404 may represent different transactions of firmware upgrades from a previous version to a current version. Entries 1620-50 include values placed in each of the fields. These values may be used to determine whether to approve or deny a firmware upgrade based on the MCBF differences caused by the existing upgrades.

Field 1602 relates to a previous firmware version that had been executing on printing devices in system 100. This list may include those versions recently upgraded or immediately past upgraded. In other words, if a firmware version has been replaced twice on a group of printing devices, then the oldest firmware version may be removed from data table 1404. Field 1604 sets forth the number of devices that the previous firmware version had been running. Field 1606 relates to the current firmware version running on the printing devices set forth in field 1604. For example, entry 1620 denotes that 500 printing devices were upgraded from firmware version MN.00.00.01 to current version MN.00.00.03.

Field 1608 lists the MCBF average MCBF value for the 500 printing devices set forth for entry 1620. Field 1610 indicates the average installation date for the upgrade from version MN.00.00.01 to version MN.00.00.03. In other embodiments, field 1610 may list the last update date or the earliest update date for the switch to the newer firmware version. Further, field 1610 may list the median date of installation.

As shown by entries 1630 and 1640, upgraded firmware versions may not come from the same previous version or have the same effect on printing devices. For entry 1630, current firmware version MN.00.00.05 in field 1606 is upgraded on 400 printing devices from previous firmware version MN.00.00.02 in field 1602. The average MCBF value after the upgrade is 6,111 as shown in field 1608. For entry 1640, current firmware version MN.00.00.05 also is shown in field 1606 but the previous firmware version in field 1602 is MN.00.00.03, which results in an average MCBF value of 8,222. It should also be noted that the firmware upgrade reflected in entry 1640 is about 11 months after the firmware upgrade for entry 1630.

Data table 1404, therefore, may be utilized to make determinations on whether to upgrade firmware versions either alone or in conjunction with map 1100, disclosed above. In map 1100, MCBF correlations 1212 are disclosed, which provide an indication whether the MCBF data for the firmware versions may allow a possible upgrade. This value may be determined using data table 1404 and the associated processes disclosed below.

For example, the disclosed embodiments may use a threshold for any change in the MCBF values for a change in firmware version to indicate whether a proposed upgrade should occur. Referring to data table 1404, entry 1650 shows the transaction for the upgrade from previous firmware version MN.00.00.05 to current firmware version MN.00.00.06. Field 1604 indicates that the upgrade occurred over 99 printing devices. The average MCBF value for these devices is now 4,333. The previous MCBF values for firmware version MN.00.00.05 are 6,111 and 8,222 in entries 1630 and 1640. Thus, the upgrade to firmware version MN.00.00.06 appears to cause more errors than reduces them.

The disclosed embodiments, for example, may set a threshold of 2000 for a difference in MCBF values to deny a firmware upgrade. In other words, if data table 1404 indicates that a drop of over 2000 counts in the mean count between failures occurs for an upgrade, then remaining upgrades or proposed upgrades should be suspended pending further investigation or fix. This status may be reflected in map 1100 to suspend any upgrades until the problem is resolved.

Alternatively, the disclosed embodiments may determine that firmware upgrades that result in a sizable increase in the MCBF value should be allowed. For example, if the improvement threshold is 1000 counts, then any upgrade being observed that raises the MCBF value over 1000 should be approved. Thus, if the MCBF value for entry 1650 in field 1608 was 9,333, then the disclosed embodiments would indicate that further upgrades of the firmware should be allowed.

The disclosed embodiments also may set the number of printing devices needed for determining the MCBF value for an entry before being used to determine whether to deny or allow an upgrade based on MCBF. For example, if only 20 or less printing devices received the observed upgrade, then the disclosed embodiments may determine that not enough devices have been used to provide an effective MCBF value. The number may be set to ensure a meaningful MCBF value for the entry. Using the above example, data table 1404 may be the information for an entry available for determination operations once 50 or more printing devices have run the firmware long enough to track the MCBF rates.

Field 1610 includes the average firmware installation date for the firmware upgrade in each entry. An older average installation date may indicate that newer installations may cause problems. Alternatively, the disclosed embodiments may automatically upgrade firmware older than a fixed average installation date. The average installation date also may be used to alert personnel that upgrades have been repeatedly denied for the older version and possibly some investigation should be made as to why.

In summary, the information and values stored in data table 1404 may be used to determine how to fill the MCBF correlations field in map 1100 as "Yes" or "No." This feature may act as an additional check on improperly upgrading a firmware version when further problems may be caused. In some embodiments, data table 1404 may be used instead of map 1100 to make determinations at analytical server 130 whether to upgrade a firmware version.

In a first alternate embodiment, a method for implementing firmware upgrades to a plurality of printing devices over a network includes storing device information for each of the plurality of printing devices at an analytical server, wherein the device information includes a firmware version and applicable error codes;

collecting error information having an error code and a date of occurrence for each of the plurality of printing devices at the analytical server;

storing the error information for the each of the plurality of printing devices at the analytical server;

determining a mean count between failures (MCBF) for the each of the plurality of printing devices using the error information and a print volume of the printing device;

generating a map using the device information, error information including error codes, and the MCBF for each of the plurality of printing devices;

receiving a request to implement a firmware upgrade for at least one printing device over the network; and determining whether to send the firmware upgrade to the at least one printing device using the map.

The first alternate embodiment includes determining whether to send the firmware upgrade includes determining to send the firmware upgrade according to the MCBF for the at least one printing device.

The first alternate embodiment includes determining whether to send the firmware upgrade includes determining that an error associated with the error code cannot be fixed using the map and not sending the firmware upgrade to the at least one printing device.

The first alternate embodiment includes determining whether to send the firmware upgrade includes determining that an error associated with the error code can be fixed using the map and sending the firmware upgrade to the at least one printing device.

The first alternate embodiment includes determining whether to send the firmware upgrade includes determining that a new error will occur using the map, and not sending the firmware upgrade to the at least one printing device.

The first alternate embodiment includes collecting additional error information after installing the at least one printing device with the upgrade firmware.

The first alternate embodiment includes updating the map with the additional error information.

In a second alternate embodiment, an analytical server to implement upgrades to firmware on a plurality of printing devices over a network includes a processor;

a memory coupled to the processor, the memory storing instructions that, when executed by the processor, configures the analytical server to store device information for each of the plurality of printing devices at the analytical server, wherein the device information includes a firmware version and applicable error codes, collect error information having an error code and a date of occurrence for each of the plurality of printing devices at the analytical server, store the error information for the each of the plurality of printing devices at the analytical server, determine a mean count between failures (MCBF) for the each of the plurality of printing devices using the error information and a print volume of the printing device, generate a map using the device information, error information including error codes, and the MCBF for each of the plurality of printing devices, receive a request to implement a firmware upgrade for at least one printing device over the network, and determine whether to send the firmware upgrade to the at least one printing device using the map;

a communication port to send the firmware upgrade to the at least one printing device over the network.

The second alternate embodiment includes, wherein the instructions stored in the memory, when executed on the processor, further configuring the analytical server to determine to send the firmware upgrade according to the MCBF for the at least one printing device.

The second alternate embodiment includes, wherein the instructions stored in the memory, when executed on the processor, further configuring the analytical server to determine that an error associated with the error code cannot be fixed using the map and to not send the firmware upgrade to the at least one printing device.

The second alternate embodiment includes, wherein the instructions stored in the memory, when executed on the processor, further configuring the analytical server to determine that an error associated with the error code can be fixed using the map and to send the firmware upgrade to the at least one printing device.

The second alternate embodiment includes, wherein the instructions stored in the memory, when executed on the processor, further configuring the analytical server to determine that a new error will occur using the map, and to not send the firmware upgrade to the at least one printing device.

The second alternate embodiment includes, wherein the instructions stored in the memory, when executed on the processor, further configuring the analytical server to collect additional error information after installing the at least one printing device with the upgrade firmware.

The second alternate embodiment includes, wherein the instructions stored in the memory, when executed on the processor, further configuring the analytical server to update the map with the additional error information.

In a third alternate embodiment, a method for monitoring firmware upgrades for a plurality of printing devices over a network includes collecting a device identification number and at least one firmware package having a firmware version for each of the plurality of printing devices at an analytical server;

collecting error information from each of the plurality of printing devices regarding the at least one firmware package at the analytical server, wherein the error information includes at least one error code and a date of occurrence;

determining a mean count between failures (MCBF) for the device identification number of each printing device based on the error information;

generating a map at the analytical server, wherein the map includes the at least one firmware version, the error information including the at least one error code, and the MCBF such that each firmware version within the plurality of plurality devices is accounted for in the map;

receiving a request to upgrade the at least one firmware version on the plurality of printing devices; and determining whether to upgrade the at least one firmware version for each of the plurality of printing devices using the map.

The third alternate embodiment includes determining to delay the upgrade to the at least one firmware version based on the MCBF corresponding to the device identification number for each printing device.

The third alternate embodiment includes determining whether a number of errors associated with the at least one error code will be reduced using the map.

The third alternate embodiment includes not sending the upgrade to the firmware version if the number of errors associated with the at least one error code is not reduced.

The third alternate embodiment includes the map including relationships between the at least one error code and the at least one firmware version.

The third alternate embodiment includes updating the relationships based on collected error information after installing the upgrade to the at least one firmware version.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for implementing firmware upgrades to a plurality of printing devices over a network, the method comprising:
   storing device information for each of the plurality of printing devices at an analytical server, wherein the device information includes a firmware version and applicable error codes;
   collecting error information having an error code and a date of occurrence for each of the plurality of printing devices at the analytical server;
   storing the error information for the each of the plurality of printing devices at the analytical server;
   determining a mean count between failures (MCBF) for the each of the plurality of printing devices using the error information and a print volume of the printing device;
   generating a map using the device information, error information including error codes, and the MCBF for each of the plurality of printing devices;
   receiving a request to implement a firmware upgrade for at least one printing device over the network; and
   determining whether to send the firmware upgrade to the at least one printing device using the map.

2. The method of claim 1, wherein the determining whether to send the firmware upgrade includes determining to send the firmware upgrade according to the MCBF for the at least one printing device.

3. The method of claim 1, wherein the determining whether to send the firmware upgrade includes determining that an error associated with the error code cannot be fixed using the map and not sending the firmware upgrade to the at least one printing device.

4. The method of claim 1, wherein the determining whether to send the firmware upgrade includes determining that an error associated with the error code can be fixed using the map and sending the firmware upgrade to the at least one printing device.

5. The method of claim 1, wherein the determining whether to send the firmware upgrade includes determining that a new error will occur using the map, and not sending the firmware upgrade to the at least one printing device.

6. The method of claim 1, further comprising collecting additional error information after installing the at least one printing device with the upgrade firmware.

7. The method of claim 6, further comprising updating the map with the additional error information.

8. An analytical server to implement upgrades to firmware on a plurality of printing devices over a network, the analytical server comprising:
   a processor;
   a memory coupled to the processor, the memory storing instructions that, when executed by the processor, configures the analytical server to
      store device information for each of the plurality of printing devices at the analytical server, wherein the device information includes a firmware version and applicable error codes,
      collect error information having an error code and a date of occurrence for each of the plurality of printing devices at the analytical server,
      store the error information for the each of the plurality of printing devices at the analytical server,
      determine a mean count between failures (MCBF) for the each of the plurality of printing devices using the error information and a print volume of the printing device,
      generate a map using the device information, error information including error codes, and the MCBF for each of the plurality of printing devices,
      receive a request to implement a firmware upgrade for at least one priting device over the network, and
      determine whether to send the firmware upgrade to the at least one printing device using the map;
   a communication port to send the firmware upgrade to the at least one printing device over the network.

9. The server of claim 8, wherein the instructions stored in the memory, when executed on the processor, further configures the analytical server to determine to send the firmware upgrade according to the MCBF for the at least one printing device.

10. The server of claim 8, wherein the instructions stored in the memory, when executed on the processor, further configures the analytical server to determine that an error associated with the error code cannot be fixed using the map and to not send the firmware upgrade to the at least one printing device.

11. The server of claim 8, wherein the instructions stored in the memory, when executed on the processor, further configures the analytical server to determine that an error associated with the error code can be fixed using the map and to send the firmware upgrade to the at least one printing device.

12. The server of claim 8, wherein the instructions stored in the memory, when executed on the processor, further configures the analytical server to determine that a new error will occur using the map, and to not send the firmware upgrade to the at least one printing device.

13. The server of claim 8, wherein the instructions stored in the memory, when executed on the processor, further configures the analytical server to collect additional error information after installing the at least one printing device with the upgrade firmware.

14. The server of claim 13, wherein the instructions stored in the memory, when executed on the processor, further configures the analytical server to update the map with the additional error information.

15. A method for monitoring firmware upgrades for a plurality of printing devices over a network, the method comprising:
   collecting a device identification number and at least one firmware package having a firmware version for each of the plurality of printing devices at an analytical server;
   collecting error information from each of the plurality of printing devices regarding the at least one firmware package at the analytical server, wherein the error information includes at least one error code and a date of occurrence;
   determining a mean count between failures (MCBF) for the device identification number of each printing device based on the error information;
   generating a map at the analytical server, wherein the map includes the at least one firmware version, the error information including the at least one error code, and the MCBF such that each firmware version within the plurality of plurality devices is accounted for in the map;
   receiving a request to upgrade the at least one firmware version on the plurality of printing devices; and
   determining whether to upgrade the at least one firmware version for each of the plurality of printing devices using the map.

16. The method of claim 15, further comprising determining to delay the upgrade to the at least one firmware version based on the MCBF corresponding to the device identification number for each printing device.

17. The method of claim 15, further comprising determining whether a number of errors associated with the at least one error code will be reduced using the map.

18. The method of claim 17, further comprising not sending the upgrade to the firmware version if the number of errors associated with the at least one error code is not reduced.

19. The method of claim 15, wherein the map includes relationships between the at least one error code and the at least one firmware version.

20. The method of claim 19, further comprising updating the relationships based on collected error information after installing the upgrade to the at least one firmware version.

* * * * *